US006889214B1

(12) United States Patent
Pagel et al.

(10) Patent No.: US 6,889,214 B1
(45) Date of Patent: *May 3, 2005

(54) VIRTUAL SECURITY DEVICE

(75) Inventors: Martin J. Pagel, Kirkland, WA (US); Eran Librach, Mountain View, CA (US); Peiyuan Yan, Cupertino, CA (US)

(73) Assignee: Stamps.com Inc., Santa Monica, CA (US)

( * ) Notice: Subject to any disclaimer, the term of this patent is extended or adjusted under 35 U.S.C. 154(b) by 756 days.

This patent is subject to a terminal disclaimer.

(21) Appl. No.: 09/644,632

(22) Filed: Aug. 23, 2000

Related U.S. Application Data

(63) Continuation-in-part of application No. 09/115,532, filed on Jul. 15, 1998, which is a continuation-in-part of application No. 08/725,119, filed on Oct. 2, 1996, now Pat. No. 5,822, 739.

(51) Int. Cl.⁷ ................................................ G06F 17/00

(52) U.S. Cl. ......................... 705/410; 713/200; 705/50; 705/60

(58) Field of Search .......................... 705/41, 401, 410, 705/60, 408, 50; 713/200, 201; 235/375, 381

(56) References Cited

U.S. PATENT DOCUMENTS 4,253,158 A 2/1981 McFiggans ................. 364/900
4,376,299 A 3/1983 Rivest ......................... 364/900
4,511,793 A 4/1985 Racanelli .................... 235/375

(Continued)

FOREIGN PATENT DOCUMENTS

| | | | |
|---|---|---|---|
| EP | 0137737 | | 9/1984 |
| EP | 0 927 958 | | 7/1999 |
| EP | 0 927 963 | | 7/1999 |
| FR | 2580844 | | 4/1986 |
| GB | 2251210 | | 12/1990 |
| JP | 02000105845 A | * | 4/2000 |
| WO | WO 88/01818 | | 10/1988 |
| WO | WO 98/14907 | | 4/1998 |
| WO | WO98/14909 | | 4/1998 |
| WO | WO 98/57302 | | 12/1998 |
| WO | WO 98/57460 | | 12/1998 |

OTHER PUBLICATIONS

Printing system for Preventing Injustice by Delivering Print data from Postal Charge Meter To Printer; Davies Brad L.; Jan. 2000.*

U.S. Appl. No. 09/115,532, filed Jul. 15, 1998, Kara et al.

*Primary Examiner*—James P. Trammell
*Assistant Examiner*—Pierre E. Elisca
(74) *Attorney, Agent, or Firm*—Fulbright & Jaworski, L.L.P.

(57) ABSTRACT

A system and method for remote postage metering of postage indicia, including demanding a desired postage amount and subsequently printing the postage indicia onto a piece of mail. A user inputs certain necessary information, as well as additional desired information, into a local processor-based system. The local system then assembles a postage demand in suitable format and transmits the same to a remote postage metering device. The remote postage metering device then verifies the demand for authority to demand and valid funding. Upon verification, the remote postage meter serves the transaction by configuring a shared device using virtual user device data structures and assembles a data packet representing an authorized postage indicia. The data packet is transmitted to the local system for printing. Printing of the postage indicia may be unaccompanied, or may include additional information. Such additional information may include destination and return address, machine readable routing or identification information, or a complete document to be posted.

89 Claims, 6 Drawing Sheets

U.S. PATENT DOCUMENTS

| | | | | | |
|---|---|---|---|---|---|
| 4,641,347 | A | | 2/1987 | Clakr et al. | 380/3 |
| 4,725,718 | A | | 2/1988 | Sansone et al. | 235/495 |
| 4,743,747 | A | | 5/1988 | Fougere et al. | 235/494 |
| 4,757,537 | A | | 7/1988 | Edelmann et al. | 380/51 |
| 4,763,271 | A | | 8/1988 | Field | 364/466 |
| 4,775,246 | A | | 10/1988 | Edelmann et al. | 380/23 |
| 4,800,506 | A | | 1/1989 | Axelrod et al. | 364/478 |
| 4,802,218 | A | | 1/1989 | Wright et al. | |
| 4,812,994 | A | | 3/1989 | Taylor et al. | 364/464.02 |
| 4,831,554 | A | | 5/1989 | Storace et al. | 364/519 |
| 4,831,555 | A | | 5/1989 | Sansone et al. | |
| 4,837,701 | A | | 6/1989 | Sansone et al. | 364/464.03 |
| 4,858,138 | A | | 8/1989 | Talmadge | 364/464.02 |
| 4,864,618 | A | | 9/1989 | Wright et al. | 380/51 |
| 4,868,757 | A | | 9/1989 | Gil | 364/464.03 |
| 4,900,903 | A | | 2/1990 | Wright et al. | |
| 4,900,904 | A | | 2/1990 | Wright et al. | |
| 4,901,241 | A | | 2/1990 | Schneck | 364/464.02 |
| 4,908,770 | A | | 3/1990 | Breault et al. | |
| 4,941,091 | A | | 7/1990 | Breault et al. | 364/406 |
| 5,058,008 | A | | 10/1991 | Schumacher | |
| 5,065,000 | A | | 11/1991 | Pusic | 235/381 |
| 5,111,030 | A | | 5/1992 | Brasington et al. | |
| 5,150,407 | A | | 9/1992 | Chan | |
| 5,202,834 | A | | 4/1993 | Gilham | 364/464.02 |
| 5,233,657 | A | | 8/1993 | Gunther | 380/23 |
| 5,239,168 | A | | 8/1993 | Durst, Jr. et al. | 235/432 |
| 5,289,540 | A | | 2/1994 | Jones | |
| 5,319,562 | A | | 6/1994 | Whitehouse | 364/464.03 |
| 5,323,323 | A | | 6/1994 | Gilham | 364/464.02 |
| 5,323,465 | A | | 6/1994 | Avarne | |
| 5,341,505 | A | | 8/1994 | Whitehouse | |
| 5,423,573 | A | | 6/1995 | de Passille | 283/71 |
| 5,454,038 | A | | 9/1995 | Cordery et al. | |
| 5,490,077 | A | | 2/1996 | Freytag | 364/464.02 |
| 5,510,992 | A | | 4/1996 | Kara | 364/464.02 |
| 5,583,779 | A | | 12/1996 | Naclerio et al. | 364/464.02 |
| 5,602,743 | A | | 2/1997 | Freytag | 364/416.18 |
| 5,606,613 | A | * | 2/1997 | Lee et al. | 380/21 |
| 5,619,571 | A | | 4/1997 | Sandstrom et al. | |
| 5,623,546 | A | | 4/1997 | Hardy et al. | |
| 5,655,023 | A | * | 8/1997 | Cordery et al. | 380/51 |
| 5,696,829 | A | * | 12/1997 | Cordery et al. | 380/55 |
| 5,715,314 | A | | 2/1998 | Payne et al. | |
| 5,717,596 | A | | 2/1998 | Bernard et al. | 364/464.02 |
| 5,742,683 | A | | 4/1998 | Lee et al. | |
| 5,774,886 | A | | 6/1998 | Kara | |
| 5,778,076 | A | | 7/1998 | Kara et al. | |
| 5,796,834 | A | | 8/1998 | Whitney et al. | |
| 5,801,364 | A | | 9/1998 | Kara et al. | |
| 5,801,944 | A | | 9/1998 | Kara | |
| 5,812,991 | A | | 9/1998 | Kara | |
| 5,819,240 | A | | 10/1998 | Kara | |
| 5,822,739 | A | * | 10/1998 | Kara | 705/410 |
| 5,825,893 | A | | 10/1998 | Kara | |
| 5,946,671 | A | | 8/1999 | Herring | 705/404 |
| 5,983,209 | A | | 11/1999 | Kara | 705/407 |
| 6,005,945 | A | | 12/1999 | Whitehouse | 380/51 |
| 6,061,670 | A | | 5/2000 | Brand | 705/404 |
| 6,233,565 | B1 | * | 5/2001 | Lewis et al. | 705/35 |

* cited by examiner

FIG. 1C
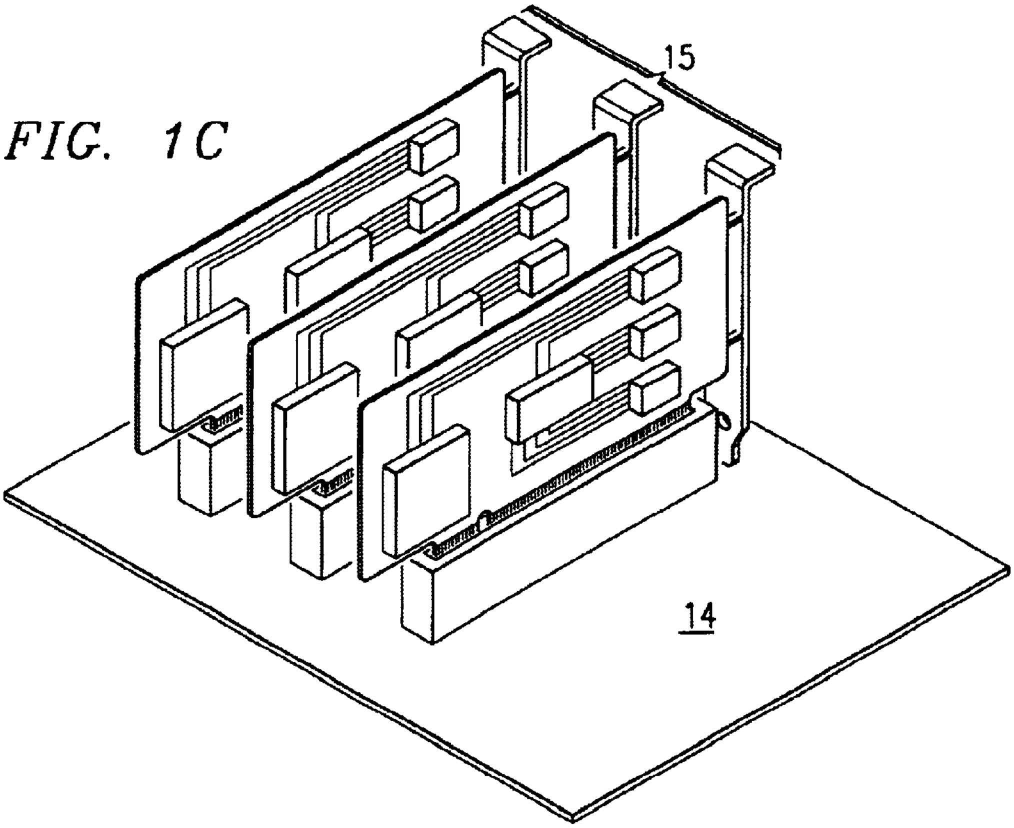
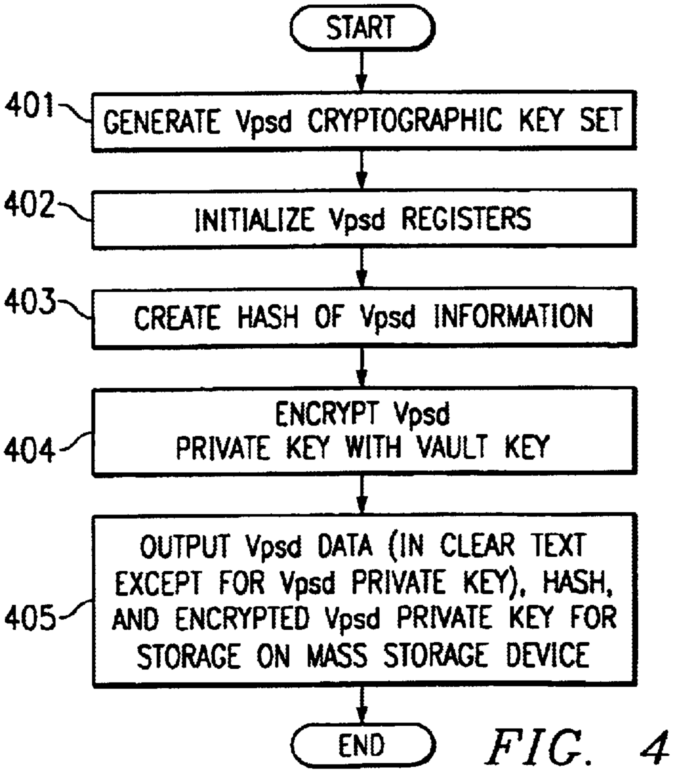
FIG. 4

VIRTUAL SECURITY DEVICE

REFERENCE TO RELATED APPLICATIONS

The present application is a continuation-in-part of copending U.S. application Ser. No. 09/115,532, entitled "SYSTEM AND METHOD FOR REMOTE POSTAGE METERING" filed Jul. 15, 1998, which is itself a continuation-in-part of U.S. application Ser. No. 08/725,119, entitled "SYSTEM AND METHOD FOR REMOTE POSTAGE METERING" filed Oct. 2, 1996 now U.S. Pat. No. 5,822,739, and is related to U.S. application Ser. No. 08/729,669, entitled "SYSTEM AND METHOD FOR DETERMINATION OF POSTAL ITEM WEIGHT BY CONTEXT" filed Oct. 2, 1996, now U.S. Pat. No. 5,83,209, and U.S. application Ser. No. 08/727,833, entitled "SYSTEM AND METHOD FOR RETRIEVING POSTAGE CREDIT CONTAINED WITHIN A PORTABLE MEMORY OVER A COMPUTER NETWORK" filed Oct. 2, 1996, now U.S. Pat. No. 5,812,991, each having a common assignee, which applications are hereby incorporated by reference.

TECHNICAL FIELD OF THE INVENTION

This invention relates, in general, to the storage of information, such as postage credit value, securely and, more specifically, to providing secure storage of information while minimizing the requirements in number and/or in size of secure memory devices, such as postage security devices.

BACKGROUND OF THE INVENTION

Presently, it is common for individuals or businesses to have residing within their offices a postage meter rented from a commercial supplier. This arrangement is very convenient, since letters may be addressed, postage applied, and mailed directly from the office without requiring an employee to physically visit the United States Post Office and wait in line in order to apply postage to what is often a quite significant volume of outgoing mail, or to manually apply stamps to each piece of mail in which case mail is slower because it has to go through a postage canceling machine.

Quite naturally, postage meters were developed to relieve the manual application of stamps on mail and to automate the above process. Nevertheless, a postage meter residing within an office is not as convenient and efficient as it may first seem to be. First, a postage meter may not be purchased, but must be rented. The rental fees alone are typically over twenty dollars per month. For a small business, this can be quite an expense to incur year after year. Second, a postage meter must be adjusted, serviced and replenished manually; e.g., each day the date must be adjusted manually, periodically the stamp pad must be re-inked, and when the amount of postage credit programmed within the postage meter has expired, the postage credit must be replenished. To be replenished, a postage meter must be manually unplugged, placed into a special case (the meter is of a significant weight), and taken to a United States Post Office to have the meter reprogrammed with additional postage credit. Upon arrival at the United States Post Office, a teller must cut the seal, replenish the meter with a desired amount of postage credit, and reseal the meter. The meter must then be returned to the office and powered up.

A slightly more expensive meter (rental of approximately $30.00 more) works in the following manner: 1) a user sets up an account with the meter supplier, 2) 7 to 10 days before a user requires any postage, the user deposits with the meter owner the amount of postage required, 3) the user then calls the owner (7 to 10 days later) and they issue instructions as to the manual pushing of a variety of buttons on the meter (programming) which will replenish the postage amount on the meter. Nonetheless, the meter must be taken to the Post Office every 6 months.

Thus, in addition to the monthly rent, the servicing and replenishing of the meter requires the time and expense of at least one employee to take the meter to the United States Post Office to have it checked. Of course, this procedure results in down-time wherein the postage meter is not available to the business for the application of postage to outgoing mail. In addition, because of the monthly rent and the size of these devices, it is generally not practical for businesses to have more than one postage meter to alleviate this down-time.

A more recent solution to postage metering is disclosed in U.S. Pat. No. 5,510,992 entitled SYSTEM AND METHOD FOR AUTOMATICALLY PRINTING POSTAGE ON MAIL, and is hereby incorporated by reference. There, the disclosed metering system provides for the sale of postage credit on portable processor devices to be later utilized as needed. However, such a system, although considerably more convenient than the traditional metering systems discussed above, still requires the prepurchase of postage credit in order to be available at the time of generating a postage indicia.

The alternative to a postage meter and its associated prepurchased postage credit to a business, especially a small business, is to forego the advantages of a postage meter and to buy sheets, or books, of stamps. Without a doubt, this is not a sufficient solution. A variety of denominations of stamps are generally required since applying two 32¢ stamps to a letter requiring only 40¢ will add up over time. Additionally, it is difficult for a business to keep track of stamp inventories, and stamps are subject to pilferage and degeneration from faulty handling. Moreover, increases in the postal rate (which seem to occur every three years) and the requirement for variable amounts of postage for international mail, makes the purchase of stamps even more inefficient and uneconomical.

Because of different postage zones, different classes of mail, different postage required by international mail and the inefficiency of maintaining stamps within an office, it is important to have an automatic postage system, such as the aforementioned inefficient and relatively expensive postage meter.

A need in the art therefore exists for a system and method that provides the correct amount of authorized postage on demand at locations other than a United States Post Office, while avoiding the use of a traditional postage meter or the use of any supply of postage credit at the demand site. Moreover, there is a need in the art for a system and method which allows the substantially instantaneous affixing of this authorized postage upon an item of mail after demand.

It is, therefore, advantageous for the provision of postage credit to be transmitted to demanding locations by a substantially automated system and method. Furthermore, any such system and method needs to maintain strict controls on the issuing of such indicia. These controls may provide verification of a request for postage so as to expose any rogue postage requests.

Additionally, it would be advantageous for any processor-based system providing postage metering requests and subsequent imprinting to interface with a user friendly operating environment that is flexible and which can be coupled to other programs such as word processing, spreadsheet, accounting, database, or graphics programs. It would further be advantageous for a processor-based system providing postage metering to also provide verification and/or updating of address information to ensure speedy and reliable delivery of mail pieces without requiring an operation to manually look-up or update such information.

SUMMARY OF THE INVENTION

The preferred embodiment of the present invention addresses the above-described problems of providing postage credit by providing a postage metering system and method whereby the metering of the postage, i.e., the assessing of payment and authorizing of postage, is accomplished at a remote location allowing access to a plurality of processor-based systems demanding postage. Preferably, the postage demands are verified to ensure such demands are authorized to receive indicia of postage to be funded in accordance with the demand. Of course, other forms of value or proof of value may be transferred according to the present invention, such as payment coupons, event/transportation tickets, value indicia, etcetera.

According to the preferred embodiment of the present invention, a security device as may be embodied in a portable memory, such as a postal security device (PSD), is utilized in authorizing value transfer and/or generating indicia of value. The preferred embodiment of the present invention provides for multiple user access to such a security device. Accordingly, operation of a preferred embodiment of the present invention configures the security device to operate uniquely for ones of the multiple users to thereby provide users with a unique "virtual" security device, i.e., a shared security device configured with a particular user's information to create a virtual user device.

It will be appreciated that a technical advantage of the present invention is that a user can easily demand, fund, receive and print postage indicia from a processor-based system, such as a general purpose computer, Internet terminal, or other customer premise equipment, that does not include a postage metering device. A further technical advantage is that provision of postage indicia by the present invention is accomplished nearly instantaneously, thereby providing postage on demand.

Provision of postage indicia according to the present invention is substantially automated, thus requiring a minimum of operator involvement in the transmittal of postage credit. Furthermore, substantial automation in assessing the amount of postage required, as well as demanding, finding, receiving and printing postage indicia, results in a similar reduction in user involvement in utilizing the invention.

Further technical advantages are realized by the inclusion of encrypted data within, or accompanying postage indicia printed as a result of the present invention. Such advantages include the ability to identify rogue use of such postage indicia as well as both the metering and printing sites utilized with a particular postage indicia. Furthermore, by including a POSTNET bar code and/or including delivery point codes such as ZIP plus four plus two, a reduction in postage may be realized. Thus, use of the remote postage meter system is not only more convenient than a conventional postage meter but it can also save the user money on postage.

Technical advantages are realized by the communication of postal information associated with the demand for postage. In addition to the above mentioned advantage of lower postage costs by the inclusion of a communicated ZIP code as POSTNET bar coding accompanying the indicia, addressee information communicated to the remote metering device may advantageously be verified or corrected at the metering device. By transmitting the destination address of the postal item for which the indicia is to be generated, the remote metering device may verify or change the address to a format suitable for use by the issuing authority prior to its application on a postal item. Furthermore, omitted or erroneous information, such as ZIP code information, could be supplied or verified. Likewise, through the use of an address book, the use of shorthand representations of a desired destination address or other information may be utilized. Where this address book is stored centrally, the information may be automatically updated, or otherwise maintained in a current accurate state, without individual user attention. Of course, updating of an address in a particular user's address book may include notifying the user of the updated information, such as at the time of requesting postage for that particular address, or may simply provide the updated information, such as were only a zip code has changed.

These and other needs and advantages are met in a preferred embodiment of the present invention in which a first processor-based system, preferably a general purpose processor-based system such as a personal computer (PC), is located within a business' office or an individual's home. The first PC stores or otherwise utilizes a program, hereinafter referred to as the "Demand" program, accepts information from a user, a coupled device, or the context in which the postal item is being created or sent regarding the amount of desired postage and the mail piece for which it is needed. The Demand program subsequently makes a demand for postage to a remote postage meter.

The remote postage meter, itself preferably a second processor-based system in the form of a PC, is located at a postage provider's office or other central source. The second PC stores a program, hereinafter referred to as the "Meter" program, which verifies postage demands and electronically transmits the desired postage indicia to the first PC in the form of a data packet. For security purposes, the data packet may be encrypted or otherwise protected, or may include information allowing its use only by a selected Demand program, such as the Demand program actually demanding the postage.

Subsequently, the Demand program receives the data packet and prints postage indicia, designating the appropriate amount of postage, on a printer or special purpose label-maker coupled to the first PC. The postage indicia may contain encrypted information, such as transaction identification, the sender's and/or recipient's address or the Meter and/or Demand program serial number, to be utilized by the postal service for security or other purposes. Of course, other techniques for providing message authentication may be utilized according to the present invention, such as digital signatures, such as where secrecy of the message or portions thereof is not desired. The Demand program preferably interfaces with the user through the display screen and an input device, such as a keyboard, or mouse. The data packet could contain the indicia for printing with a specific Demand program or it may contain data which allows the Demand program to generate its own indicia.

The Demand program may be coupled to a word processing program, or other process, residing within the first PC, thus allowing the user to request and subsequently print the postage indicia on correspondence or postal items generated by the coupled process. In such an arrangement, the Demand program may utilize information from the coupled process to determine a correct amount of postage from the context of the correspondence, such as size or weight of paper, draft or correspondence mode, etcetera. Additionally, the Demand program may be programmed to independently print a destination address and return address in addition to the postage indicia to be printed on an item of mail. Thereafter, an item of correspondence bearing the postage indicia can be placed in envelopes with cutouts or glassine paper at the appropriate areas so that the address, return address, and/or postage indicia can be visualized through the envelope.

In the preferred embodiment, the Demand program provides security at the demand site to prevent unauthorized utilization of the postage metering system. The appropriate level of security for any installation of the Demand program can be chosen by a principal at each location, thereby providing a distributed security system. Distributed security provides the ability for individual users of the postage metering system to select a level of security appropriate to prevent postal theft in their environment. Such distributed security does not increase the risk of postage loss at the remote meter as, regardless of the level of security chosen at the demand site, verification is performed by the Meter program to ensure each demand is valid and properly funded.

In addition, the Demand program can be used to transmit a variety of information to be encoded by the Meter program within the postage indicia using symbol technology. Such information is machine readable and can be used to identify postage indicia forgeries. The Demand or Meter programs may also encode a variety of information into a bar code or other code format that may be printed separately from the postage indicia. For example, the Demand program could automatically produce a "partial" indicia, such as from a portion of the indicia data ZIP+4 to be printed on the postal item. The remote Meter program will then, by knowing what the Demand program has produced or will produce, generate the remainder of the indicia to match this partial indicia. Thus, any attempt to intercept the indicia transmitted from the Meter program will result in a partial or mismatched indicia printed by the interceptor.

Provision of postage indicia by the remote meter of the present invention may also be utilized to provide anonymous postage. The Meter program may be programmed to issue authorized postage wherein the postage indicia ultimately printed does not include any identification of the demanding system. Although the United States Postal Service (USPS) currently requires postage meter identification on postage indicia, the remote metering system may be utilized to provide anonymity as the required meter identification may indicate the remote postal meter rather than any individual's postal meter.

An added advantage of the remote meter is that it may be utilized to provide postal address checking. A database of current postal addresses may be maintained at the remote meter site and utilized by the Meter program to verify the current address when postage is demanded. The dynamic nature of a current postal address database makes it inefficient to maintain such a database local to the user, but the centralization of the information allows the use of such a database more economically.

In the preferred embodiment, the Demand program is able to automatically calculate the correct postage to place on a letter, parcel or label as a function of the class, zone and weight of the particular item to be mailed. Alternatively, the Meter program is able to automatically calculate the correct postage from information contained within the demand. Also, a balance may be coupled to the first PC so that mail can be placed on the balance and the weight of the mail automatically entered into the Demand program for calculating the correct postage for that mail item. These calculations can be made locally or remotely, or as a combination of each.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1A illustrates processor-based systems of the preferred embodiment of the present invention;

FIGS. 1B and 1C illustrate alternative embodiments for coupling portable memories to the processor-based systems;

FIG. 4 illustrates a flow diagram of initialization of a virtual security device according to a preferred embodiment of the present invention;

DESCRIPTION OF THE PREFERRED EMBODIMENTS

Figures 1A, 1B:
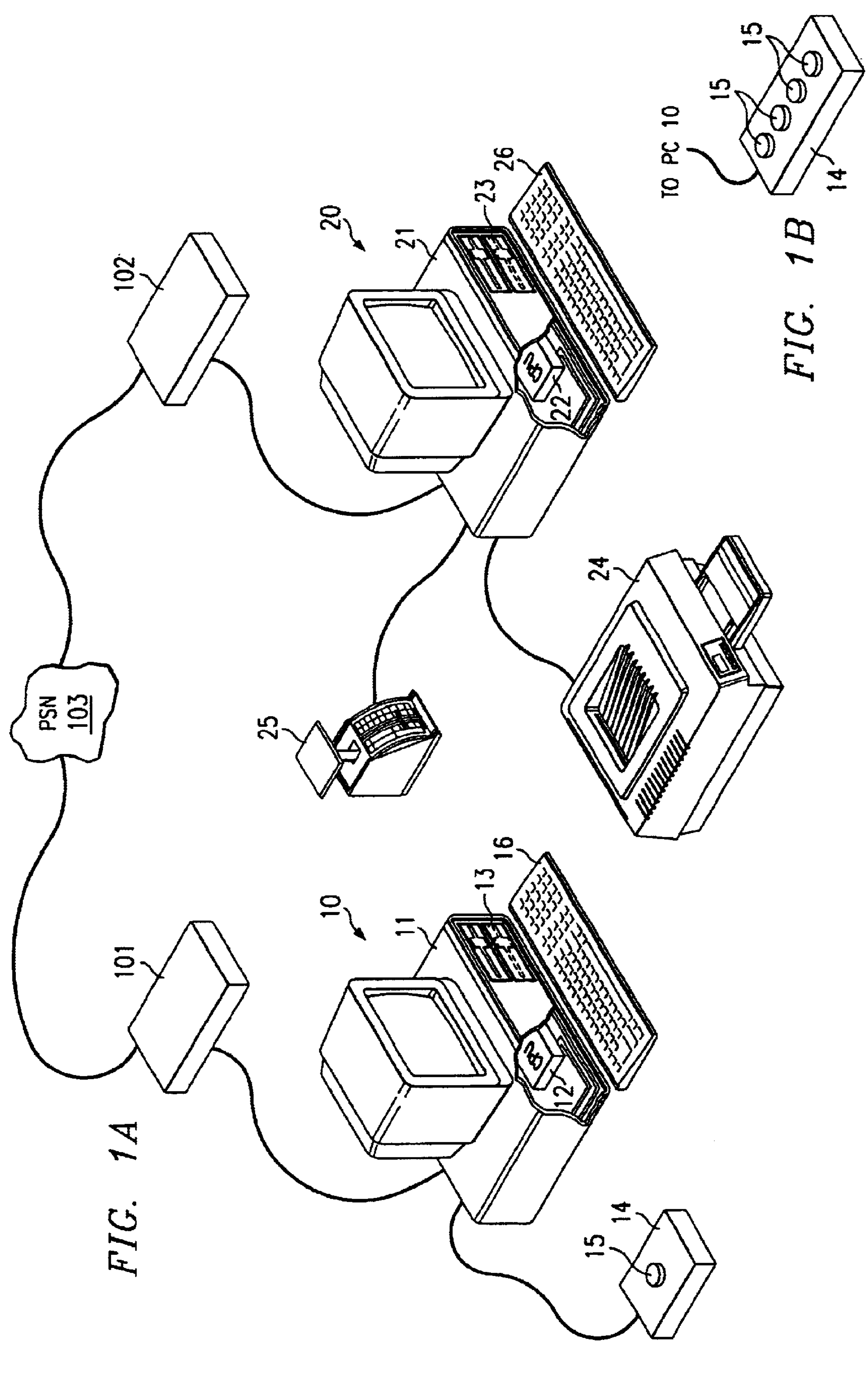

The present invention allows an individual to purchase a desired amount of postage at a location remote from a postal metering device, such postage being electronically transmitted to the individual nearly instantaneously upon demand. In a preferred embodiment the user invokes a first processor-based system (PC) to request and receive postage via a program, hereinafter referred to as the "Demand" program, stored on the first PC. The Demand program requests input from the user, coupled devices, or processes about the weight of the item to be mailed, the destination address, etc. The Demand program utilizes the input information to calculate the amount of desired postage for an item to be mailed. Of course, the postage amount may be input into the host or calculated at the remote meter, if desired. A demand for postage is then made to a remote metering system. This postage is to be subsequently printed by the first PC on an envelope, label or letter through a printer or special purpose label maker coupled to the first PC.

Although referred to herein as the Demand program, it shall be appreciated that a processor-based system may demand postage according to the present invention without actually storing a specific Demand program thereon. For example, an embodiment of the present invention may utilize a generic browser in order to operate a platform independent Demand program, such as an HTML, XML, or JAVA based web page served from a web server operating according to the present invention. Likewise, use may be made of a generic communication interface, such as an e-mail system, to transmit and/or receive demands and responses according to the present invention.

It should be understood that the Demand program, in addition to its unique process of creating a postage demand and subsequent printing of postage indicia, also may incorporate information processing modules common in the art. Such a processing module may be a data communications program for establishing and/or maintaining a link between the first and second PCs. Additionally, the Demand program may include an encryption module utilizing cryptographic key sets, hereinafter called postal purchase keys (PPK), for encrypting and/or digitally signing postage demands and decrypting the received data packet and/or verifying a digital signature. Such processes are well known in the art and will not be discussed in detail in this specification.

The PPK may be distributed to the first PC in any number of ways. Since the PPK provides means by which a PC may decrypt a received data packet, it is advantageous to distribute such PPK by reliable secure means. One way to distribute the PPK is to provide them with the Demand program. An alternative means of distribution is by recording the PPK on a portable memory means such as, for example, a computer readable disk or a touch memory utility button (TMU), as disclosed in the above U.S. patent and referenced co-pending application, hereby incorporated by reference, and transmitting it by the mail.

The Demand program demands the postage from a remote postage metering device preferably physically located away from the first PC. In the preferred embodiment the remote postage meter is itself a second PC, typically located at a postage provider's office. The remote postage meter stores a program, hereinafter referred to as the "Meter" program, which verifies postage demands and enables the Demand program to print the desired postage indicia by the transmission of a data packet.

Referring to FIG. 1A, there are illustrated processor-based systems 10 and 20 utilized in the preferred embodiment of the present invention. Specifically, PC 10 is utilized to implement the aforementioned Meter program and PC 20 is utilized to implement the Demand program. PC 10 includes chassis 11 enclosing processor (CPU) 12 and disk drive 13 and includes keyboard 16. Likewise PC 20 includes chassis 21 enclosing CPU 22 and disk drive 23 and includes keyboard 26. PCs 10 and 20 are general purpose computers, such as an IBM compatible (or Apple Macintosh) controlled by any general purpose operating system such as DOS, UNIX, WINDOWS, or LINUX. It should be noted that PCs 10 and 20 may be computers of differing types and/or controlled by differing operating systems.

Furthermore, PC 10 is preferably adapted for receiving postal credit stored in portable memory 15 through a receiving device 14. PC 20 may also advantageously be coupled to or otherwise include a receiving device such as receiving device 14 depicted coupled to PC 10.

The use of such a receiving device at PC 20 would facilitate the use of a portable memory device, such as portable memory 15, to transmit the PPK utilized by the invention. It will be appreciated by those skilled in the art that the use of a portable memory device to store the PPK allows for both the transmittal of the PPK from a postage supplier to the user by a known trustworthy means. Furthermore, by having the ability to removably couple the PPK to PC 20 and/or PC 10, added security is accomplished by the simple removal of the portable memory device and thus the PPK.

The portable memories themselves, the data files storing postage credit, and/or the processor-based system, may be secured in order to provide security for postage credit, if desired. For example, the portable memory may be physically secure and tamper resistant, data files storing postage credit may be secured through the use of encryption algorithms, or the processor-based system may be disposed in a secure environment.

According to one embodiment, portable memory 15 incorporates a small disk, which is light-weight, portable, and essentially non-breakable, having a memory and CPU, such as a touch memory utility button (TMU) from Dallas Semiconductor, Dallas, Tex. Additionally or alternatively embodiments of portable memory 15 according to the present invention may comprise a smart disk, such as SMART DISK which can be obtained from Smart Disk Security Corporation, Naples, Fla., a smart card, such as a plastic card with an embedded microchip, and/or a circuit card, such as a PCMCIA card currently used on notebook computers for modular storage. It should be appreciated that, receiving device 14 may be adapted differently than illustrated in FIGS. 1A and 1B, depending upon the particular portable memory device utilized. For example, receiving device 14 may be embodied in a disk drive where a smart disk is used as a portable memory device. Likewise, receiving device 14 may be embodied in a card slot, such as may be provided as a card edge receiver on a main circuit board or as may be provided as an interface on a buss internal or external to a host system, where a circuit card is used as a portable memory device.

A preferred embodiment circuit card suitable for use in providing a portable memory according to the present invention is the 4758 PCI cryptographic coprocessor available from International Business Machines Corporation, Boca Ratan, Fla. The 4758 PCI cryptographic coprocessor is particularly suited for use according to the present invention because it is commonly available, adapted to install in a standardized computer buss having high speed peripheral access, and provides FIPS 140-1 security.

Although the memory device utilized in storing postal credit has been described above with respect to a preferred embodiment as being "portable," it should be appreciated that operation of the present invention may be accomplished with devices which are not readily portable. For example, in an alternative embodiment, disk drive 13, which may be a hard disk drive or other media, is utilized for storing postal credit received by PC 10, such as through modem 101. Of course, in this embodiment receiving device 14 and portable memory 15 may be omitted if desired. However, receiving device 14 and portable memory 15 may still be utilized in this embodiment, such as for the PPK as discussed below.

In a preferred embodiment of the present invention, the above described portable memory, such as the aforementioned 4758 PCI cryptographic coprocessor, is used in combination with another memory, such as the aforementioned disk drive, to store postage credit. For example, portable memory contents may be configured for a particular user or users and, when not in use by such users, off loaded from the portable memory and stored in another memory, such as a memory providing bulk storage of data files, to thereby permit loading of data to configure the portable memory for use by a different user or users. Such an embodiment is particularly advantageous where a large number of users require the services of the Meter program, for example, where a component having limited memory resources associated therewith, such as portable memory 15 adapted to provide a security vault to receive, increment, decrement, transfer, etc. value credit, is used. According to this embodiment the portable memory may be configured to properly serve particular users as desired, without requiring resources sufficient to serve all users at all times.

Instead of providing a dedicated secure memory device, the memory device for each user or group of users may be represented by a data structure that can only properly be manipulated by loading it into the appropriate memory device, preferably providing the desired level of security, thereby providing a "virtual" memory device for the users. Accordingly, the virtual security device of this embodiment incorporates the same functionality as described herein with respect to manipulating credit value.

Directing attention to FIGS. 1B and 1C, alternative embodiments of receiving device 14 are shown. Here receiving device 14 is adapted to allow simultaneous coupling of a plurality of portable memories 15 to PC 10. Accordingly, an array of portable memories 15 may be utilized by PC 10 in order to service multiple simultaneous users, i.e., multiple ones of PC 20 coupled thereto demanding postage according to the present invention. Likewise, an array of portable memories 15 may be utilized by PC 10 in order to provide a total amount of postage credit desired, such as where a postal authority limits the value of postage which may be stored in a single portable memory and it is desired to provide a total amount of postage available for satisfying demands in excess of this limit.

It should be appreciated that receiving device 14 may be provided internal to, or integral with, PC 10, if desired. For example, receiving device 14 of FIG. 1C may be embodied in the expansion slots of a PC main circuit board, such as where portable memory 15 is a circuit card. Moreover, a plurality of portable memories 15 may be provided to serve user demands by providing a plurality of PC 10*s*, such as through the use of network communications, any of which may include a plurality of portable memories coupled thereto.

Of course, the array of portable memories discussed above may be coupled to the host processor-based system through the use of individual receiving devices, such as multiples of the embodiment of the receiving device shown in FIG. 1A, rather than that shown in FIGS. 1B and 1C. Moreover, there is no limitation to the plurality of postage credits utilized by the present invention being stored in a portable memory. For example, multiple amounts of postage credit, possibly replenishable by communication through modem 101 as discussed above, may be utilized to provide service for multiple demands or a desired total amount of postage credit.

Moreover, postage credit to be distributed to demanding PCs may not initially be input into PC 10, but rather the amounts of postage credit transmitted to ones of PC 20 may be recorded at PC 10. Thereafter, the postal authority, through which the transmitted postage credit is to be utilized, is compensated by the postage provider.

However, where a postal authority has not authorized a postage provider to distribute postage credit without first compensating the postal authority, it may be advantageous to utilize a receiving device such as a modem (not shown) whereby direct communications to a postal service may be utilized to receive postal credit such as may be stored in portable memory 15 or disk drive 13. Alternatively, a receiving device, such as receiving device 14, suitable for coupling PC 10 with a TMU button, such as portable memory 15, containing an information record of prepaid postage credit may be utilized.

Referring again to FIG. 1A, it can be seen that PCs 10 and 20 may be linked together through Public Switched Network (PSN) 103 via modems 101 and 102. PSN 103 may be comprised of any number of now existing or later to be developed communications means. In the preferred embodiment, PSN comprises public telecommunications lines and switching equipment. Alternatively, PSN 103 comprises communication over the Internet or similar wide area public gateway. Additionally, PCs 10 and 20 may be linked directly through digital telecommunications trunks (not shown) or through a digital network system, cable system, or satellite system (all not shown). It shall be understood that in utilizing a digital network system to link PCs 10 and 20 that modems 101 and 102 may be replaced by network interface cards (NIC) or other digital communications devices, e.g., ISDN. It will be appreciated by those of skill in the art that any network linking PCs 10 and 20 may either be secure or not depending on the degree of postage credit transmission security desired.

With further reference to PC 20 illustrated in FIG. 1A, printer 24 and balance 25 are depicted. Printer 24 is coupled to CPU 22 and provides printing means for the postage indicia and is, of course, optional if printing of the postage indicia is not desired. Balance 25 is also coupled to CPU 22 and provides automated input of the weight of a postal item into the Demand program. Of course, balance 25 is optional, and input of postal item weight may be accomplished manually by an operator or automatically from a coupled process, such as a word processor, if desired.

Figure 2:
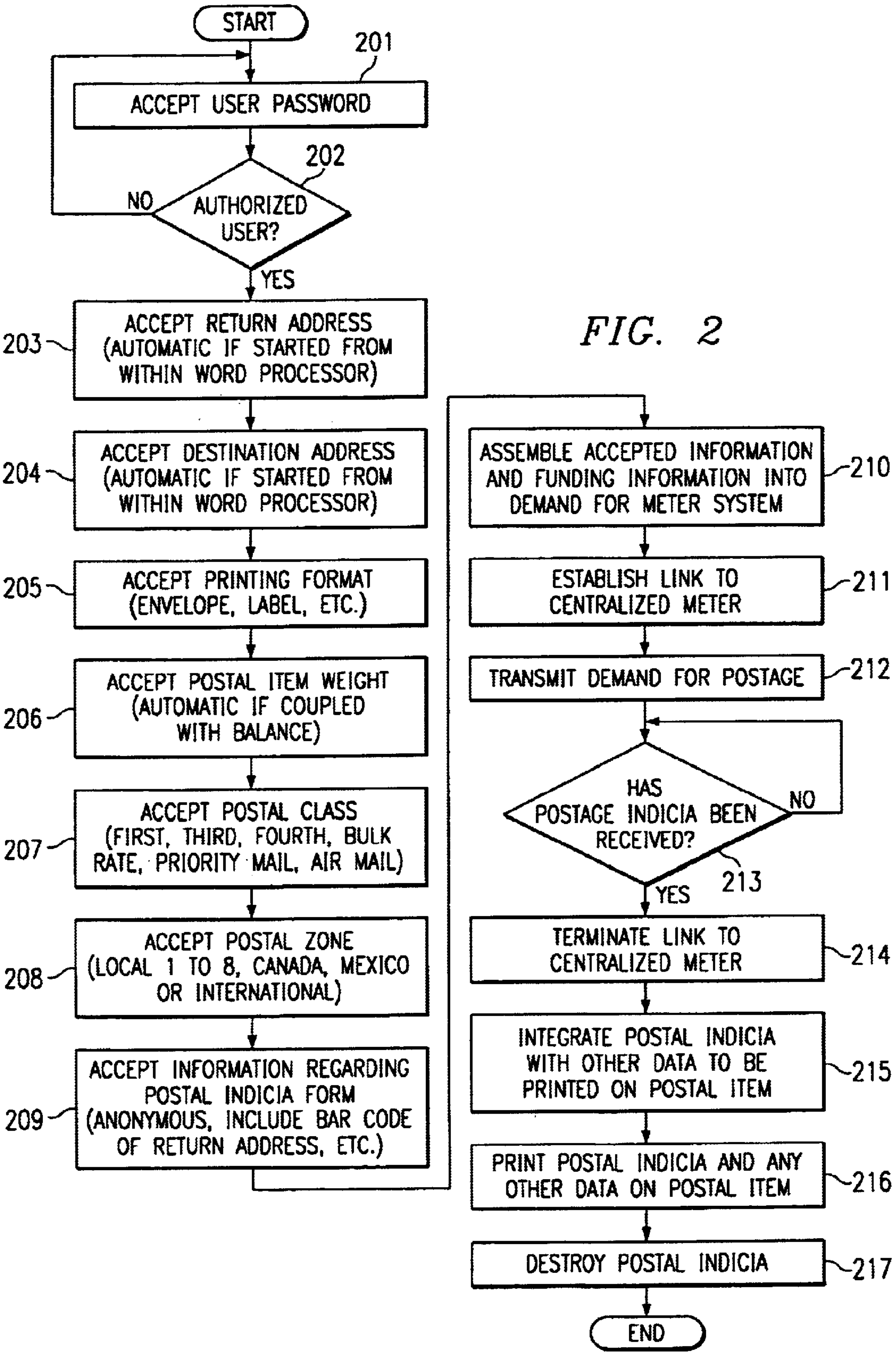
FIG. 2 illustrates a flow diagram of the demand process of the present invention.

Directing attention to FIG. 2, a flow diagram of the preferred embodiment of the Demand program is depicted. Upon activation of the Demand program, the user is asked for, and the process accepts, a user password (step 201). At step 202, the Demand program determines if the accepted password is valid. If the password is not valid, the process returns to step 201, thus preventing unauthorized access to postage. If the password is valid, the process continues to step 203.

Of course, password acceptance and verification steps 201 and 202 may be eliminated, thus providing no password security for the process, if desired. Alternatively, password acceptance and verification steps 201 and 202 may be accomplished at a different point in the process than illustrated in FIG. 2.

At step 203 the Demand program accepts the postal item sender's return address. As indicated in step 203, the return address may be communicated to the Demand program automatically if the Demand program is coupled with another process, such as a word processing program. Furthermore, the return address information may be utilized by the Demand program to later print the return address along with the postage indicia on a postal item. If determined to be advantageous, such as, for example, if required by a postal authority, the return address information may also be transmitted to the remote postage metering system for inclusion in a generated data packet or for validation of the postage demand. The return address information can also be encoded within a generated postage indicia in such a way as to be machine readable and thus suitable for utilization in preventing postal fraud.

Alternatively, return address acceptance step 203 may be eliminated if desired. Specifically, where anonymous postage indicia is desired, acceptance of return address information is not necessary to the generation of acceptable postage indicia.

At step 204 the Demand program accepts the postal item destination address. The address information may be utilized by the Demand program to later print the destination address along with the postage indicia on a postal item. Moreover, the destination address information may also be transmitted to the remote postage metering device for inclusion in a generated data packet or for validation of the correct address. Of course, address acceptance step 204 may be eliminated if desired.

As indicated in step 204, the address may be communicated to the Demand program automatically if the Demand program is coupled to another process such as a word processing program. Moreover, the destination address information provided in step 204 may be a shorthand designation of a desired destination address.

Accordingly, an address book or database may be utilized by the present invention in completing the destination address. This address book may be stored locally, such as by PC 20 generating the demand according to the present invention, or may be central, such as at PC 10 metering the postage according to the present invention. As will be discussed in detail below, there are advantages provided in centrally storing such address information. Additionally, whether stored locally or centrally, an address book or other database may be utilized to provide additional information utilized in demanding and printing postage according to the present invention. For example, selection of a particular shorthand, and thus a particular destination address, may also select a printing format, a postal zone, a postal class, and/or information regarding the postal indicia form utilized as discussed below. Alternatively, the short hand designation may be utilized to select any of the above information items either alone or in any combination.

At step 205 the Demand program accepts printing format information to be utilized when ultimately printing the postage indicia. Such formats may include predefined sizes of envelopes and labels as well as user defined items. The Demand program uses the format information for adjusting the postage amount for the size of the postal item as well as for determining the size of postage indicia to be printed. In addition, the printing format information may also be utilized by the remote metering device for such purposes as determining what information to include in a generated data packet. Printing format acceptance step 205 may be eliminated if desired.

At step 206 the Demand program accepts the postal item's weight. As indicated in step 206, the weight may be communicated to the Demand program automatically from a balance in data communication with the Demand program. Of course, the Demand program may also accept weight information through other means, such as keyboard 26.

However, weight information may also be calculated by the Demand program from other information, thus eliminating the need for any direct input of weight. For example, information regarding the printing format, such as accepted in step 205, as well as specific document information, such as is generally available in word processing or other applications, may be utilized by the Demand program to determine the weight. In example, the Demand program weight determination may use information regarding the size and number of pages as well as the context of the document, such as word processing draft, from a coupled word processor in combination with the aforementioned printing format, as shown in the above referenced patent entitled "SYSTEM AND METHOD FOR DETERMINATION OF POSTAL ITEM WEIGHT BY CONTEXT".

It shall be appreciated, simply by knowing the size and number of pages of correspondence, that generally a very close approximation of the required postage may be calculated based on a standard or common paper weight and envelope size. However, this approximation may be made more precise by inputting information regarding the specific envelope or container to include the correspondence, such as may be determined from the above accepted printing format or may be input directly in a step not shown. Additionally, the precision of the postage determination may be increased by the input of the actual paper weight to be used by the correspondence. This information may be provided by a manual input step (not shown) or may be determined automatically, such as from information as to the context of the document provided by the coupled application.

It shall be appreciated that a user may assign certain paper weights and/or sizes to particular document contexts either within the Demand program (not shown) or within a coupled application. For example, correspondence quality printing from a word processor may be associated with 20 pound bond paper, whereas draft quality printing from the same word processor may be associated with 15 pound paper. Similarly, printing of invoices or statements from an accounting program may be associated with two parts, or two copies, of 15 pound paper. Of course, paper size as well as print quality may be supplied by the coupled process or may be manually input. Thereafter, this information may be utilized by the Demand program to precisely determine the weight, and therefore the proper postage required to post such items, without the need to either weigh the postal item or input its weight.

Preferably, the weight information, or information used in its determination, is utilized by the Demand program in the automatic calculation of the necessary amount of postage for the postal item. However, this information may instead be transmitted to the remote postage metering device for inclusion in a generated data packet or for calculation of the necessary amount of postage.

At step 207, the Demand program accepts the postal item's postal class. The class information is utilized by the Demand program in the automatic calculation of the necessary amount of postage for the postal item. Optionally, the postal class information is transmitted to the remote postage metering device for inclusion in a generated data packet.

At step 208, the Demand program accepts the postal item's postal zone. The zone information is utilized by the Demand program in the automatic calculation of the necessary amount of postage for the postal item. Optionally, the postal zone information is transmitted to the remote postage metering device for inclusion in a generated data packet.

If desired, postal item weight acceptance or determination step 206, postal class acceptance step 207, and postal zone acceptance step 208 may be replaced by a step simply accepting a desired postage amount.

At step 209, the Demand program accepts postage indicia information to be utilized by the remote metering device when generating a data packet. Such information may include indicating the desire for anonymous postage indicia or inclusion of return and/or destination address in machine readable format to be contained within the printed postage indicia. It shall be appreciated that the postage indicia information may not only be utilized by the remote metering device in generation of a data packet, but may be utilized by the Demand program when printing the postage indicia on a postal item. Postage indicia information acceptance step 209 may be eliminated if desired.

Steps 203 through 209 are not illustrated in this sequence because of any limitation of the present invention, and may be performed in any order with respect to each other according to the present invention.

Subsequent to accepting information, the Demand program assembles predetermined portions of this information into a demand which is of a format suitable for communication to, and acceptance by, a remote metering device (step 210). Preferably, assembly step 210 includes the substeps of determining what information the user desires to be included in the generated postage indicia, determining if an accompanying bar code is desired, and if so, determining what information is to be included therein, and determining the amount of postage the postage indicia should indicate. These substeps provide means by which the Demand program creates a demand for postage suiting the user's needs and desires without the need to transmit superfluous data across PSN 103. Reducing the data transmitted in the demand to only that which is necessary to generate the desired postage indicia serves to reduce the communication time necessary to transmit the demand. This in turn reduces the cost involved in the transmittal, as the communication link may be maintained for a shorter time as well as the user being idle for a shorter time while waiting on transmission and response.

Certain data stored within PC 20 is also preferably included within the demand. Such data includes a public encryption key from the PPK, a certificate for the public encryption key, and/or information suitable for identifying a proper public encryption key to be utilized. It is well known in the art that information encrypted using a public encryption key is only decryptable using a corresponding, and presumably private, decryption key. Therefore, the public key of the PPK included within and/or identified by the demand corresponds to a private decryption key of the PPK held at PC 20. Inclusion of a public encryption key within the demand, facilitates the encryption by the metering system of a generated data packet so that it might only be meaningfully utilized at the demanding PC holding the private decryption key. Of course, other techniques may be utilized according to the present invention. For example, a technique used according to the SSL protocol, wherein an encryption key is derived from a shared secret such as a password, may be used if desired.

Additionally, data included within the demand preferably includes a method of funding the transaction, a serial number contained within the Demand program, and/or other unique data. The included serial number or unique data is utilized by the remote metering device for validation of the demand. Of course, inclusion of additional information within the Demand program may be eliminated if desired.

It shall be appreciated that information indicating a method of funding the transaction may be stored within system 20, such as on disk drive 23, to be included within the demand by the Demand program. Similarly, such information may be incorporated into the Demand program itself such as, for example, where a debit or deposit account is established with the postage provider at the time of initializing the Demand program. Of course, an additional information acceptance step (not shown) may be added to the Demand program whereby the user inputs information regarding the funding of the postage demand.

Assembly step 210 preferably includes the use of an encryption process to encrypt the demand which is to be sent via PSN 103 and/or to provide a digital signature thereof. Subsequent to the assembly of the demand, the Demand program initiates a public key encryption process well known in the art to encrypt the demand and/or to provide a digital signature, such as may include an encrypted hash of the demand. When the demand is encrypted, meaningful use of the encrypted demand may only be accomplished by decrypting the demand with a private key available only to the remote metering device. Of course, this encryption substep may be eliminated if desired.

Subsequent to assembling the demand, the Demand program establishes a link between PCs 20 and 10 (step 211). The link established in step 211 is a link suitable for data communications between PCs 10 and 20, such as PSN 103 illustrated in FIG. 1A. In the preferred embodiment, linking step 211 includes the substeps of dialing a data communications access phone number, providing information as to which resource available through the data communications access is to be utilized, and verifying that data communications with a remote metering system has been accomplished.

Establishing a link between PCs 10 and 20 may be accomplished at a point in the process other than that illustrated in FIG. 2. It is advantageous to utilize as temporally short of communications link as possible in situations where there is a time dependent charge involved for maintaining such links. However, there is no limitation of the present invention to establish and terminate the communications link. For example, where digital telecommunications trunks (not shown) or a digital network system (not shown) are utilized for linking PCs 10 and 20, a data communication link may advantageously be maintained for extended periods of time.

It shall be appreciated that the step of establishing a link between PCs 10 and 20 may include authentication of the user. For example, where the link between PCs 10 and 20 is via the Internet, the step of establishing a link there between may include use of the SSL protocol, well known in the art, to authenticate the user. Authentication may likewise be accomplished through the use of transmission of an encryption, i.e., transmission of an encrypted string and the clear text string for authentication of the encryption at the remote site, interchange of an encrypted string where a first system transmits a value encrypted and the second system must decrypt the value and re-encrypt the value using a different key for decryption at the first system, transmission of unique identification information comparable to a database at the remote system, etcetera. Such authentication of the user may be used in combination with the aforementioned encryption of data packets or may be used in the alternative, if desired.

Upon establishing the link in step 211, the demand is transmitted to PC 10 (step 212). The Demand program then monitors the link for receipt of a returned data packet at step 213, returning to step 213 if no postage indicia has yet been received. After receipt of the data packet the link between PCs 20 and 10 is terminated (step 214). However, as discussed above, there is no limitation requiring termination step 214 to be accomplished at all or in the order depicted in FIG. 2.

Step 215 involves integrating the data packet with any other data to be printed on the postal item. A substep of decrypting the received data packet, utilizing a private key of the PPK held at the demanding system, is utilized if encryption is desired. Decryption of the data packet near the time of printing the postage indicia is advantageous in preventing postal fraud accomplished by multiple uses of a single data packet. However, decryption may be accomplished at any time prior to printing the postage indicia. Of course, step 215 may be omitted if integration with other data or encryption is not desired.

It shall be understood that as an alternative, or in addition, to the use of encryption in the transmission of the data packet, a system wherein the transmitted data packet only contains information sufficient to enable the forming of a portion of the desired postage indicia may be used if desired. Such a system provides added security by requiring the receiving PC to generate, or otherwise match, the remaining portion of the postage indicia in a form so as to complete the transmitted portion of the indicia. In a preferred embodiment, the Meter program selects the portion of postage indicia to transmit based on a record of past demands by the particular Demand program. Likewise, the Demand program selects the remaining portion of a postage indicia to print based on a similar record of past demands. It will be appreciated that it is very unlikely that any PC, intercepting the transmission of the demand or the resulting data packet, would be able to predict the correct content of the remaining portion of a postage indicia to be printed. Therefore, an extra measure of security against rogue use of the postage indicia is afforded by such a system.

The data integrated with the data packet by step 215 may include sender's return address, destination address, or postal instructions, such as class of mail or special handling instructions. Where the Demand program is coupled with another process, such as a word processor, spreadsheet, accounting, database, or graphics program, the other data may include an entire document created by this other process. An advantage realized by the inclusion of other data with the data packet at time of printing is that hand addressing or multiple printing of postal items is not necessary to imprint both postage indicia or any other information.

At step 216, the Demand program causes PC 20, in conjunction with printer 24, to print the postage indicia and any integrated data upon a postal item. Step 216 utilizes portions of the information accepted at steps 203 through 209 to produce a printed result suitable for the user's needs and desires. Printing format information accepted at step 205 is utilized to determine the size, format, and placement of the printed postage indicia. Moreover, depending on user preference, other information, such as postal class, may also be included on the postal item as printed.

The process of the Demand program preferably concludes with the destruction of the data packet upon successful printing of the postage indicia on a postal item (step 217). Preferably, the Demand program monitors PC 20 for errors associated with an unsuccessful print process before destroying the data packet. Alternatively, the Demand may query the user as to the success of the printing process.

Destruction of the data packet is advantageous in discouraging postal fraud, but is not required by the present invention. As discussed above, the postage indicia itself may include machine readable information to aid in the detection of postal fraud. Such information may include return address, destination address, date, time, or unique information such as the Demand program serial number or a transaction number. This machine readable information could be utilized by the postal service to detect postal fraud by such indicators as destination address on the postal item and encoded within the postage indicia not matching.

Furthermore, including a unique transaction number within the printed postage indicia aids in the detection of postage fraud. This unique transaction is machine readable, and upon two occurrences of the same transaction number, postage fraud is indicated. Moreover, a transaction number may be generated so as to indicate the remote postage metering device that originally distributed the postage credit. With this information, determination of the demanding PC is a simple process of reviewing transaction logs at the remote metering device.

Upon completion of the steps illustrated in FIG. 2, the Demand program may either terminate its execution, thus returning control of PC 20 to another process, or return to an earlier step to continue the process again. It shall be understood that, although the foregoing discussion disclosed the demand for a single postage indicia, multiple ones of the postage indicia may be demanded in any session. Such multiple demands are advantageous in situations where a large amount of mail requires postage. These situations often present themselves in a business environment.

Figure 3:
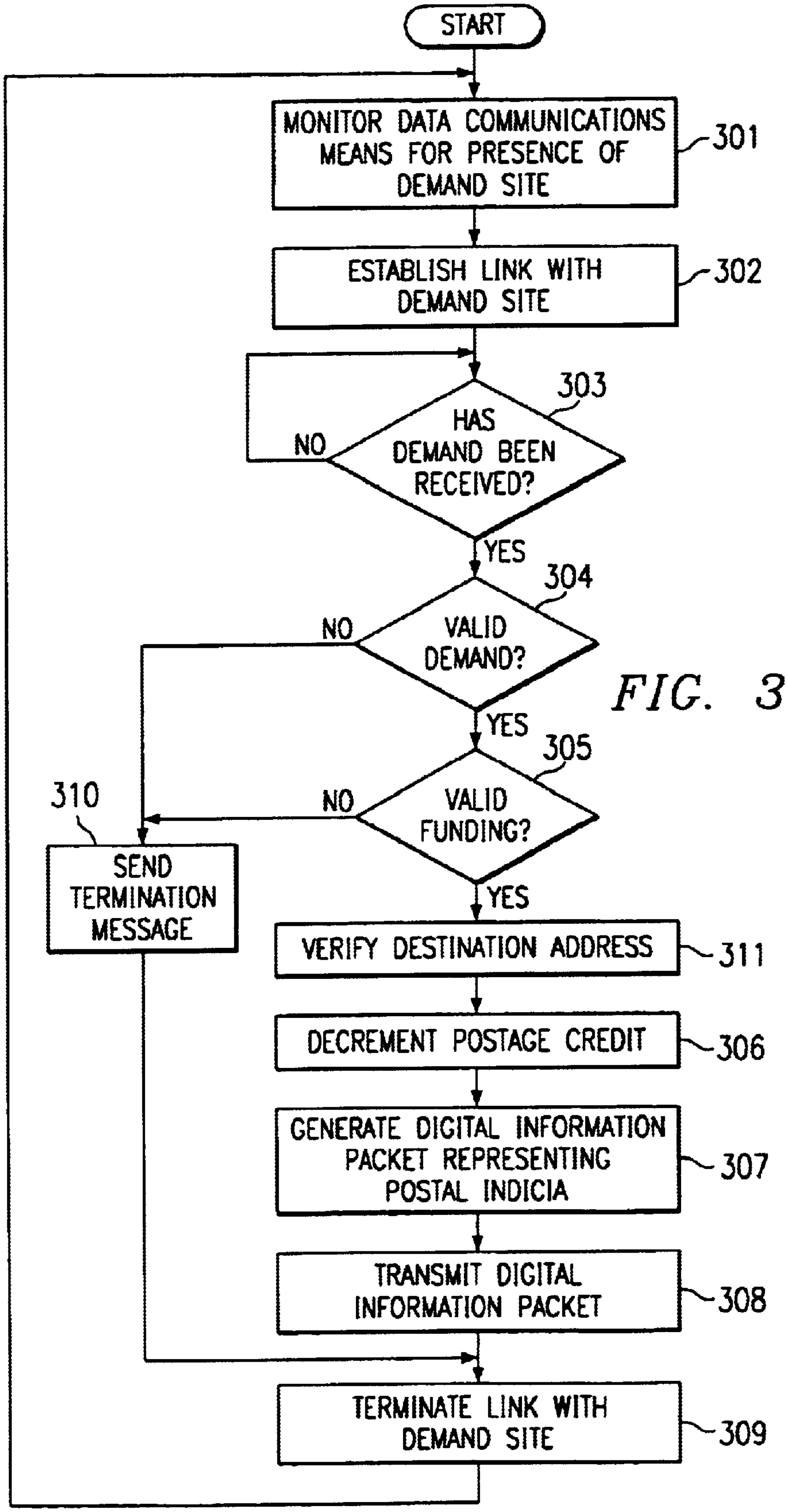
FIG. 3 illustrates a flow diagram of the meter process of the present invention.

Having explained in detail the Demand program of the preferred embodiment of the present invention, attention is directed to FIG. 3, wherein a flow diagram of the preferred embodiment of the Meter program is depicted. Upon execution of the Meter program, data communications are monitored for the presence of a demand site (step 301). When the Meter program detects the presence of a demand site, a link capable of data communication is established at step 302. As discussed in association with the Demand program, establishing a link between PCs 10 and 20 may be accomplished at a point in the process other than illustrated in FIG. 3. For example, in an alternative embodiment, where digital telecommunications trunks (not shown) or a digital network system (not shown) are utilized for linking PCs 10 and 20, a data communication link may advantageously be maintained for extended periods of time.

Likewise, as discussed above, establishing a communication link may include steps of authentication of the user of PC 20. Accordingly, where the communication link is the Internet, for example, the SSL protocol may be utilized to authenticate a user prior to a connection between PCs 10 and 20 useful for the transfer of postage there between is established.

Subsequent to establishing a data communications link, the Meter program accepts a demand transmitted from a demand site (step 303), returning to step 303 if no demand has yet been received. Accepting a demand includes the substep of decrypting the demand utilizing a decryption key available at PC 10 where encryption of the demand is used.

At step 304, the Meter program validates the demand and, if found valid, proceeds to step 305. Validation is preferably accomplished by verifying selected information contained within the demand against validation data available at PC 10. Data unique to the demand site, such as the Demand program's serial number or the Demand program's communication link address (e.g., telephone number, Internet address, or E-Mail address), may be utilized in verification step 304. Additionally or alternatively, validation may include other information such as a determination that the received demand is in a proper format or is encrypted using a particular known key and/or authentication of the demand message where a digital signature or other message authentication code is used. An advantage of the verification process is that added system security is realized as a result of reducing the possibility of a rogue being able to independently create a valid demand. Of course, where rogue demands for postage are not a concern, validation step 304 may be eliminated.

It shall be understood that encryption of the demand and validation of the demand may be used in the disjunctive or the conjunctive to achieve a desired level of security. Furthermore, as discussed above, the transmission of a partial postage indicia may also be utilized to provide security against unauthorized use of postage indicia.

If it is determined that a demand is invalid, a termination message explaining the reason for denying the demand is transmitted to the demanding site at step 310. Thereafter, the Meter program terminates the data communication link between systems PCs 10 and 20 (step 309) and begins monitoring the data communications device for the presence of a demand site. However, where it is advantageous to maintain the data communications link between PCs 10 and 20, the determination of an invalid demand will not result in termination of the data communications link. Instead, the Meter program sends a message indicating the cause for denial (step 309) and then again monitors for demands (step 303).

At step 305, the Meter program preferably uses funding information found within the demand, such as a particular account from which funds are to be provided or identification of a user to properly associate a known account with the request of the demand, to determine if proper funding is available for the transaction. Funding for the postage demanded may be accomplished in various ways. The user of the on-demand postage system may have a credit or debit account with the postage provider or may utilize point of sale funding methods such as a valid bank card account. Use of credit and debit accounts require the user to supply the postage provider with certain information prior to the postage demand. In the case of a credit account, the user may be periodically billed for postage previously demanded. In the case of a debit account, the user prepays for postage to be demanded in the future. Upon making demands for postage, costs of the transaction are deducted from the user's debit account. In the case of a bank card account being utilized, the provider will demand payment from the bank card company concurrent with the postage demand. In some situations, credit could be maintained at the local site and transmitted with the indicia request.

Funding the transaction may involve both the amount of the postage necessary to post the postal item and a charge by the postage provider for the on-demand postage service. Accordingly, the amount of the postage may be determined by the Demand program by utilizing available information, including the postal item weight, in conjunction with postal rate information maintained in a database stored on disk drive 23 within PC 20. Alternatively, the amount of postage may be determined by the Meter program by utilizing information within the demand, including the postal item weight or information sufficient for its determination, in conjunction with postal rate information maintained in a database stored on disk drive 13 within PC 10. Of course, the amount of postage may also be input directly by the user making the demand if desired.

If it is determined that proper funding is not available, a termination message explaining the reason for denying the demand is preferably transmitted to the demanding site at step 310. Thereafter, the Meter program terminates the data communication link between PCs 10 and 20 (step 309) and begins monitoring the data communications device for the presence of a demand site. Where it is advantageous to maintain the data communications link between PCs 10 and 20, the determination of lack of proper funding will not result in termination of the data communications link. Rather, the Meter program sends a message indicating the cause for denial (step 309) and then again monitors for demands (step 303).

Upon determination of proper funding, the Meter program may check the destination address included in the demand to verify that it is a proper address (step 311), if desired. Of course, where address verification or updating is not desired, step 311 may be omitted.

Address checking is preferably accomplished by comparing the destination address to a database of addresses stored, for example, on disk drive 13 within PC 10. Accordingly, corrected or updated destination address information, such as a new ZIP code, additional ZIP code digits such as ZIP plus four plus two, forwarding addresses, or the like may be provided for use both within the meter stamp to be generated as well as at the demanding system for posting the mail piece.

Additionally, as discussed above, the destination address may be a shorthand designation of a desired destination address and/or other information. Accordingly, where an address book, or other database, of information associated with a particular user or demanding system is maintained at PC 10, step 311 may include reference to the database in order to determine the desired information, such as the destination address. It shall be appreciated that this embodiment of the present invention provides several advantages. Specifically, as only a shorthand designation of a potentially long string of information is communicated, more efficient use of the available bandwidth may be realized. Additionally, as information, such as the destination address, is maintained at a centralized system, this information may be easily and constantly updated as well as updated off line in order to more quickly service demands for postage. For example, as a postal customer files a notice of change of address, this centrally stored address book may be updated to reflect the changed information. It shall be appreciated that the central address book or other database may not in fact store a complete set of the desired information, but may instead store pointers to a common database, such as an official postal service database, in order to facilitate updating of the information for example.

Other information stored in this centralized database may, as mentioned above, provide particular selections with respect to the meter stamp and/or mail piece being generated. Moreover, the database of this embodiment of the present invention may provide mail piece content, such as the text of a form letter or the like to be posted with the demanded postage.

Upon determination of proper funding and verification of the destination address, the Meter program increments a record of the amount of postage credit transmitted for later compensation to the Postal Authority. Alternatively, the Meter program deducts the amount of postage to be used by the postage indicia from a postage credit, such as may be stored in a portable memory 15 coupled to PC 10 through receiving device 14, available at PC 10 (step 306). Where multiple amounts of postage credit are stored at PC 10, such as through the use of the aforementioned array of portable memories, step 306 may include a determination of an available portable memory and/or an available postage credit for use in the present transaction. Such a determination may include a determination as to a particular portable memory not currently utilized in responding to a demand for postage from another Demand program, a particular postage credit having sufficient value to provide the demanded amount of postage, a determination of a combination of postage credits suitable for providing the demanded amount of postage, or the like.

It shall be appreciated that the Meter program may itself be provided with postage credit through such means as authorization by an official postal service, direct connection to a postal service office, or portable electronic postage credit. The details of the provision of postage credit to the Meter program is not shown, but may be, for example, the system shown in above referenced and incorporated U.S. Pat. No. 5,510,992.

The Meter program utilizes information contained within the demand to generate a data packet representing the desired postage indicia (step 307). The data packet includes information required of a valid postage indicia by a postal service. Such information may include the date of posting, the amount of the postage, a unique transaction identifier, and identification of the metering device. The information may also include data to be printed with the postage indicia, such as the sender's return address, at the user's preference. Moreover, this information, or portions thereof, may be encrypted or digitally signed, such as through interaction with a secure device such as portable memory 15, to provide for authentication of the postage meter stamp. However, such a process may require a significant amount of processor time. Accordingly, where such schemes are utilized, the preferred embodiment of the present invention utilizes the aforementioned array of postage credit storage devices in order to provide accelerated service of simultaneous demands from a plurality of systems.

The data packet may be a digital representation or image of the postage indicia to be ultimately printed by the demanding site. Such a representation may be accomplished by any number of graphic image formats well known in the art. Such formats include PDF, JPEG, GIF, POSTSCRIPT, PCL, or any other suitable format of graphics data. It will be appreciated by those skilled in the art that the provision of the data packet in a graphics format provides a form of security as proprietary image generation algorithms may be withheld from public use. When utilizing such a graphic image format, any information that the user desires to be included within the postage indicia must be transmitted to the Meter program for inclusion in the data packet. Of course, the use of a graphic image format is optional and may be replaced by any other suitable means for transferring the postage indicia.

For example, the data packet may be digital information sufficient to enable the Demand program to construct a valid postage indicia image either by completing a portion of a transmitted digital image or by generating a postage indicia using data suitable to enable generation contained in the data packet. This embodiment has the advantage of being bandwidth efficient in that less data is transmitted than when utilizing a complete graphic image and any information to be included in the postage indicia may remain at the demand site. The disadvantage to generating the postage indicia image at the demand site is that the image generation algorithm must be distributed to the users, and is thus more susceptible to unauthorized utilization.

At step 308 the data packet generated from the received demand is transmitted via the data communications link to the demand site. Thereafter, the data communications link is terminated between PCs 10 and 20. However, it shall be understood that, as discussed above, there is no limitation requiring termination step 309 to be accomplished in the order depicted in FIG. 3. Where it is advantageous to maintain the data communications link between PCs 10 and 20, termination step 309 may be accomplished at some time other than upon transmittal of the generated data packet.

Having described operation of both the Demand and Meter programs according to a preferred embodiment of the present invention, operation of "virtual" memory devices, such as may be associated with particular users of the systems and methods herein, according to a preferred embodiment is provided with reference to FIGS. 4–8. According to a preferred embodiment, a virtual storage device is utilized for providing storage of postage credit and, therefore, is also referred to herein as a virtual postal security device (Vpsd).

A Vpsd may be advantageous in situations where a one to one relationship is desired between users and PSDs, such as in the United States where the United States Postal Service (USPS) requires that postage meter monetary counters be tracked peruser. In a situation where a server provides postage credit to a number of different and unassociated users, such as in the case of remote metering described herein, there would not be visibility into what user obtains credit from which device, etc. Moreover, current USPS regulations require a postage metering license per post office or per region. Accordingly, a PSD may be required, having a proper license associated therewith, for each post office or region. Because a server type arrangement may maintain a great number of users, keeping discrete PSD devices or PSD information for all such users in a single hardware device may not be feasible. However, using a Vpsd configured for particular users or groups of users allows a server type configuration to easily comply with such requirements by storing Vpsd data structures in a database, which are loaded for usage into a hardware device and, afterwards, stored back in the database.

In order to provide a desired level of security, the preferred embodiment of the present invention utilizes a secure device, such as a variety of the aforementioned portable memories adapted to provide a desired level of security (preferably both electrical and physical), to host all Vpsd operations. Accordingly, in order to change any state of a Vpsd according to this preferred embodiment the Vpsd is passed into the secure device, where the operation is performed, the Vpsd state is modified, and then the Vpsd data structure is again saved to the database.

Preferably, the data comprising a Vpsd is substantially that contained in a typical portable memory or PSD operable according to the present invention. For example, a preferred embodiment Vpsd comprises ascending and descending registers, a private PSK and a corresponding certificate, such as a corresponding public PSK signed by a certificate authority (or its identifier such as a certificate number), a PSD ID, such as a unique serial number, licensing information, such as a USPS license number, a license ZIP code, and/or a customer ID.

It should be appreciated that storing the Vpsd contents in a typical database does not generally protect the Vpsd data against prying and/or modifications. Accordingly, the preferred embodiment implementation of the Vpsd addresses issues such as the privacy of certain information stored in the Vpsd, i.e., a private key of a postal security key (PSK) set, and/or the integrity of the information stored in the Vpsd, i.e., the host device should be able to detect any tampering with the Vpsd so that a suspect Vpsd may be disabled from further use.

According to a preferred embodiment, in order to protect a Vpsd private PSK a private vault security key (VSK) or keys, known only to secure devices operable according to the present invention, is utilized to encrypt sensitive Vpsd information, including the Vpsd private PSK, before passing the Vpsd information outside of the secure device. This private VSK may be generated within the confines of the secure device and never passed external thereto. However, in an embodiment wherein an array of secure devices are utilized, such as that illustrated in FIGS. 1B and 1C, a master device, such as a key management device which may or may not also provide secure Vpsd operations as described herein, may be utilized to generate a common private VSK and securely distribute it to the appropriate security devices, such as through the use of public/private key cryptography as is well known in the art. Accordingly, Vpsd data may be utilized on any secure device of such an array, thereby allowing any available secure device to serve a particular user's demand. Moreover, secure devices may be added to the array as deemed advantageous, by relying upon a master security device to properly distribute an appropriate VSK thereto.

Preferably, a VSK utilized according to the present invention is a symmetric encryption key, i.e., the same key is utilized both for encryption and decryption of data. Such keys are generally significantly shorter than asymmetric encryption keys, such as utilized in public key cryptography, as well as result in encryption algorithms that may be performed with less resource, and/or in less time and therefore may be relied upon to provide economies in accomplishing encryption. Of course, the present invention may utilize asymmetric keys in operation of secure devices, if desired. However, it should be appreciated that where a key of an asymmetric key pair is published, encryption utilizing the corresponding secret key will not provide secrecy of the encrypted information. Accordingly, if an asymmetric key pair where one such key is published is utilized in providing secrecy of information, such as storage of a private PSK external to a secure device according to the present invention, it is preferred that the secret information is encrypted with the published key.

In operation according to the preferred embodiment, Vpsds are generated within the confines of a secure device having a VSK associated therewith. Accordingly, a secure device preferably generates within its limits a Vpsd PSK key set and otherwise initializes the Vpsd, i.e., sets ascending and descending registers to zero, obtains a unique PSI ID, such as from a database of available IDs, etc.

Preferred embodiment Vpsd initialization steps are shown in FIG. 4. Vpsd initialization preferably includes the generation of a Vpsd cryptographic key set (step 401). The Vpsd cryptographic key set is preferably an asymmetric key set, such as provided by RSA or DSA cryptographic algorithms well known in the art, wherein a public key is published to the world and a private key is known only to the Vpsd. Accordingly, any message encrypted using the public key may only be decrypted utilizing a corresponding private key and vise versa.

Where the Vpsd is utilized for transfers of credit value, such as in postage metering applications, the public Vpsd key is preferably provided to a certification authority to be included in a certificate. Accordingly, rogue key sets may be detected and, thus, a high level of confidence provided to messages signed using a private key corresponding to the public key of such a certificate. Therefore, the preferred embodiment key set generation step includes the obtaining of a key certificate from an appropriate certification authority.

At step 402 the Vpsd registers are initialized. For example, ascending and descending registers are set to zero, or some other initialization value. Likewise, Vpsd ID information, such as a unique serial number, is preferably provided to an appropriate memory cell or register. This information may be determined internally by the security device, such as by incrementing a serial number counter within the device, or may be obtained externally, such as through reference to a database of initialized Vpsds.

It should be appreciated that initialization may be done in response to a user request to be provided a PSD. However, as it is envisioned that initialization of a Vpsd may require an amount of time sufficient to be undesirable to a user, such as to generate a key set and/or to retrieve information from a database, Vpsds may be preinitialized in anticipation of user requests. Accordingly, particular Vpsd information may be zeroed, or otherwise generically set, at initialization in anticipation of particular user information, such as a license ZIP code or customer ID, being provided when assigned to a user.

Once the data of the Vpsd is initialized, the Vpsd data may be suitably protected (steps 403 and 404) for offloading from the secure device to a bulk storage device, such as a general purpose disk drive. According to the preferred embodiment a hash value, such as a hash derived from Vpsd data using the SHA-1 algorithm, or other irreversible data uniquely tied to the Vpsd contents is stored in the Vpsd data structure, to maintain Vpsd data integrity.

For example, according to a preferred embodiment Vpsd data, or a portion thereof, is stored in clear text, i.e., text which is generally discernable to a large population, on the bulk storage device. Such an embodiment is advantageous were, as in the provision of postage credit, some or all of the Vpsd data is not secret and, therefore, does not require processor intensive operations, such as encryption, in order to maintain secrecy. Accordingly, Vpsd information for which data integrity is desired, such as ascending register and descending register information, is preferably provided at step 403 to a hash algorithm to create a unique and irreversible code associated therewith to be utilized in detecting alteration with such data stored in clear text on a bulk storage device. Contents of the Vpsd, such as the above mentioned ascending and descending registers, may be stored on an unsecure device, even in clear text, while remaining unalterable because, in order to modify the contents of the Vpsd, an associated hash also requires appropriate modification. Of course additional information, such as the entire contents of the Vpsd, may be utilized in deriving the unique information, if desired.

Because it is envisioned that well known hash algorithms may be utilized, such as the aforementioned SHA-1 algorithm, information utilized in deriving the unique information may include a secret known only to the Vpsd. For example, according to a preferred embodiment the private PSK, preferably in clear text, is utilized in production of the unique information. However, this private PSK is preferably never made available in clear text outside of the secure environment of a host security device and, accordingly, provides a portion of secret information preventing an attacker from altering the clear text information and generating corresponding unique information associated with the altered information. It should be appreciated that use of the private PSK for this purpose is advantageous as it is already available to the Vpsd and it is desired to keep this information secret. Additionally or alternatively the unique information, such as the aforementioned hash, may itself be protected, such as through encryption by either or both of the private PSK and VSK.

At step 404 the Vpsd private PSK is encrypted, preferably with the VSK, to provide privacy of this piece of information when stored outside the secure confines of a host secure device. Accordingly, the private PSK, preferably utilized in signing authentic messages from the Vpsd, such as data utilized in generating a valid postage meter stamp, may be stored on an unsecure device while maintaining its secret to all except an appropriate security device.

Thereafter, at step 405, the Vpsd information may be passed from the secure confines of a host security device for storage, such as within a hard disk drive of a host processor based system. According to the preferred embodiment of the present invention, the Vpsd information, except for the private PSK, is stored in clear text in order to minimize the amount of processing required in preparing this information for storage. Of course, where additional information is to remain secret, such information may be stored in a form other than clear text, such as by being encrypted.

It shall be appreciated that information with respect to the private PSK appears in two forms according to the above described preferred embodiment; the hash derived in part from the clear text private PSK, and the encrypted private PSK. According to a preferred embodiment, in order to make it less likely that an attacker may utilize the available private PSK information to guess the private PSK, additional measures are taken to obscure the private PSK. For example, a most preferred embodiment of the present invention utilizes an initialization vector, such as by prepending and/or post-pending random information such as random numeral strings to the private PSK, prior to its being encrypted with the VSK. Accordingly, there will not be a predictable relationship discernable to an attacker between the hash and the encrypted private PSK as stored external to the secure device.

Figure 5:
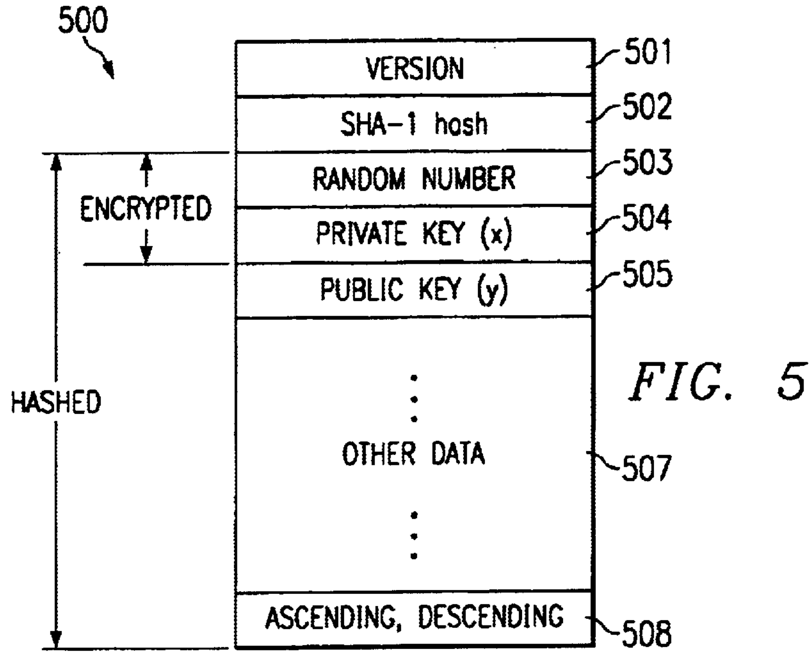
FIG. 5 illustrates a preferred embodiment data structure of a virtual security device.

A preferred embodiment data structure 500 of Vpsd data, as might be stored on a bulk storage device, is shown in FIG. 5. Data structure 500 of FIG. 5 preferably includes version information 501 suitable for providing information with respect to the particular Vpsd, such as the version of the data structure and, therefore, the location and/or data lengths of particular fields, the encryption algorithms utilized, the hash algorithms utilized, the VSK utilized, or the like. Also included in data structure 500 is hash 502 which is derived from the clear text of random number 503, private key 504, public key 505, ascending/descending registers 508, and other Vpsd data 507. Random number 503 and private key 504 are included in data structure 500 only in encrypted format. Public key 505, ascending/descending registers 508 and other Vpsd data 507 are provided in data structure 500 in clear text.

Preferably storage of the Vpsd information is within a database of Vpsds operable with the host system. Accordingly, multiple Vpsds, such as may be associated with different entities, i.e., individual users, particular groups of users, offices or departments, companies or the like, may be identified and retrieved for configuring a security device as needed to service a plurality of demands.

Figure 6:
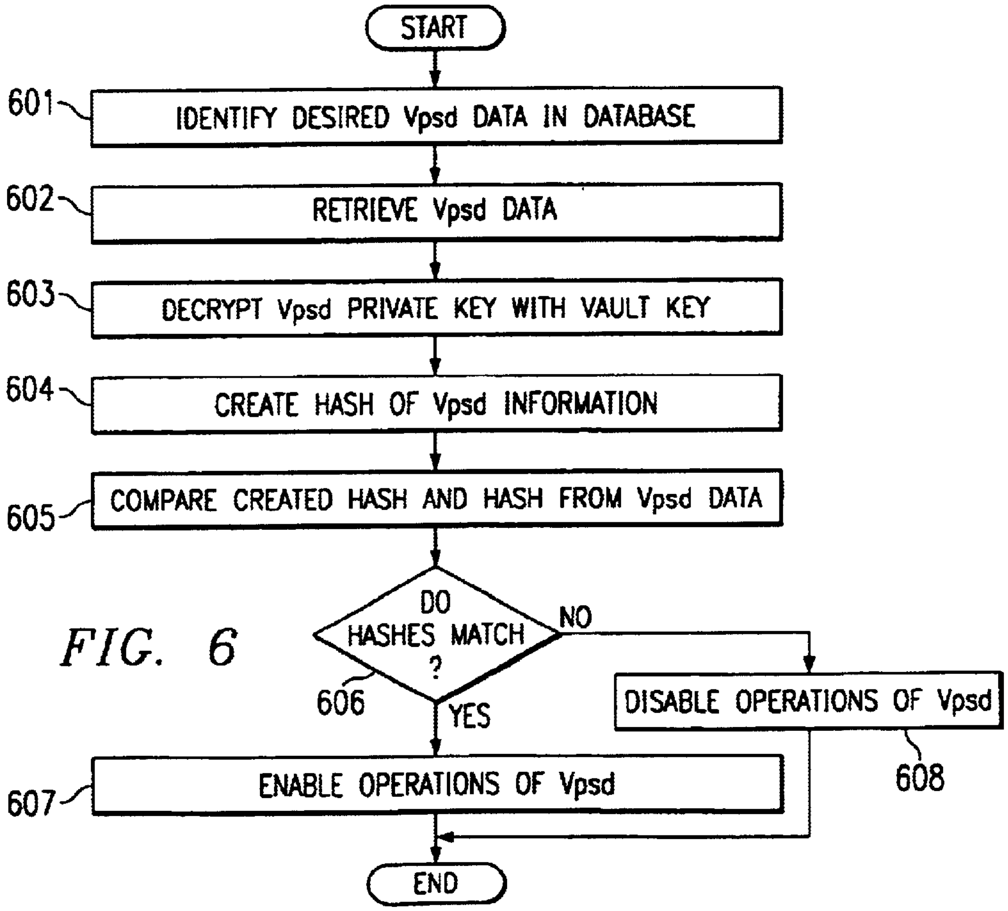
FIG. 6 illustrates a flow diagram of retrieval of a stored virtual security device according to a preferred embodiment of the present invention.

Having described initialization and storage of a Vpsd, a description of loading of Vpsd information into a secure device according to a preferred embodiment of the present invention is provided with reference to FIG. 6. At step 601 the proper Vpsd data is preferably identified from a database, or other collection, of Vpsd data.

For example, a user demand may be analyzed to determine a proper Vpsd, such as through reference to a digital signature, user ID, license number, address from which the demand was communicated, address from or to which an indicia to be generated is to be sent, and/or the like.

Thereafter, at step 602, the proper Vpsd data is retrieved into a host secure device operable according to the present invention. Preferably retrieval of Vpsd data includes the retrieval of an encrypted Vpsd PSK, Vpsd clear text information, such as may include a Vpsd license number, ascending register, descending register, etc., and a corresponding hash. Of course, additional or alternative information may be retrieved according to the present invention, if desired.

At step 603 the Vpsd private PSK is decrypted within the secure confines of the host security device. In the preferred embodiment where additional measures are taken to obscure the private PSK, such as the use of random information pre-pended and/or post-pended to the PSK, decryption of the PSK also preferably includes removal of such additional measures.

After decryption of the secure PSK, the secure device has available the Vpsd clear text information and the clear text private PSK from which the stored hash of the preferred embodiment was generated. Accordingly, a second hash may be independently generated at step 604 utilizing the same algorithm as that used in generating the stored hash. The retrieved hash and the independently generated hash may be compared (step 605) to determine if the two match. If it is determined that the hashes match (step 606), the secure device may proceed to enable operations of the Vpsd (step 607), such as value credit, value debit, device audit, device status, etc. as described in detail herein. However, if it is determined that the hashes do not match (step 606), the secure device preferably proceeds to disable operations of the Vpsd (step 607) because tampering with the Vpsd is indicated.

After performing the desired operations with the Vpsd it may again be off-loaded from the host secure device as described above with respect to initializing the Vpsd. Specifically, where operations with the Vpsd alter its data content, a hash or other unique information may again be generated to correspond to the new data values of the Vpsd and the clear text and associated hash stored on a bulk storage device. According to an embodiment of the present invention such subsequent off-loading of the Vpsd does not require further encryption or other security operations as the private PSK has already been encrypted when the Vpsd was initially off-loaded. Accordingly, processing power and/or processing time may be minimized in such an embodiment as subsequent off-loading of the Vpsd data would require only a hash or other unique data operation.

However, the preferred embodiment of the present invention provides additional security to the private PSK, such as through the use of appended random information thereto. Accordingly, this embodiment requires re-encryption of the private PSK each time the random information is altered. It should be appreciated, however, that even this embodiment is very efficient in use of resources to provide encryption as the majority of the Vpsd information remains un-encrypted. Although the un-encrypted data's integrity is ensured through the use of a hash, or similar, technique, the use of hash algorithms are far easier and faster to implement that typical encryption algorithms.

It should be appreciated that the above described technique provides protection to the Vpsd data such that only Vpsd data off-loaded from a proper security device may be utilized according to the preferred embodiment. However, where the bulk storage device is itself unsecure, such as in the preferred embodiment, the Vpsd data is susceptible to a replay attack, i.e., copying an early iteration of Vpsd data (or an entire Vpsd database) and using this data to replace a later iteration of Vpsd data (or Vpsd database), such as where credit value has been deducted in the later iteration of Vpsd data.

Accordingly the preferred embodiment of the present invention provides a technique to detect the use of replay, although otherwise valid, Vpsd data. The most preferred embodiment utilizes a log scheme to detect replay attacks.

For example, a log file may be created and stored, such as on the aforementioned bulk storage device, which includes information with respect to the operation of the secure devices and/or Vpsds. A preferred embodiment of a log file logs transactions conducted with the Vpsd, such as transactions involving value exchange or all transactions, and records information such as ascending registers and descending registers of the Vpsd involved in each transaction. Information from such a log file may be utilized to compare with the contents of a Vpsd in order to detect a replay thereof.

However, according to the preferred embodiment of the present invention, log file information is stored in bulk storage media, such as that utilized for the storage of Vpsd information. Accordingly, the log file is also subject to a replay attack.

A preferred embodiment of the present invention provides information within the log file suitable for determining alteration thereof, such as a replay and/or tampering such as to remove a log entry therefrom. A most preferred embodiment of the present invention utilizes a counter, such as a transaction counter incremented for each Vpsd operation stored within the log file. Accordingly, by analyzing the sequence of log entries for a particular security device it may easily be determined that an entry is missing if the counter information includes gaps.

The above-mentioned counter information stored within each log entry is very useful in determining if a log entry has been deleted from a log file, such as might be the case when a replay of Vpsd data is attempted and thus the appropriate subsequent log entries are deleted in an attempt to avoid detection of the replay. However, recording of counter information within the log entries alone may be insufficient to prevent a replay of all data, including a log file. Accordingly, the preferred embodiment of the present invention maintains counter information within the corresponding secure device. For example, counter information corresponding with the counter information of the last log entry may be securely stored within the secure device, independent of the data of the various Vpsds used therewith, in order to allow the secure device to independently verify that a log file has not been rolled back due to a replay attack.

It should be appreciated that information in addition to or in the alternative to the aforementioned counter information may be utilized according to the present invention. For example, a master ascending and/or descending register may be utilized to detect tampering with log data.

Description of the preferred embodiment log file is made herein with reference to single secure device for which Vpsd operations therein are logged in order to simplify presentation of the concepts of the present invention. However, it should be appreciated that the use of multiple secure devices, such as the above described array, is within the scope of the present invention. Accordingly, preferred embodiments of the present invention may utilize a common master log file, which may be maintained for all Vpsds and all secure devices operable within a particular system, or any subset thereof. Alternatively, a log file for each such secure device may be utilized, if desired. However, in such an embodiment it is preferable that all such log files be audited together in cases where a Vpsd is shared between multiple secure devices.

Figure 7:
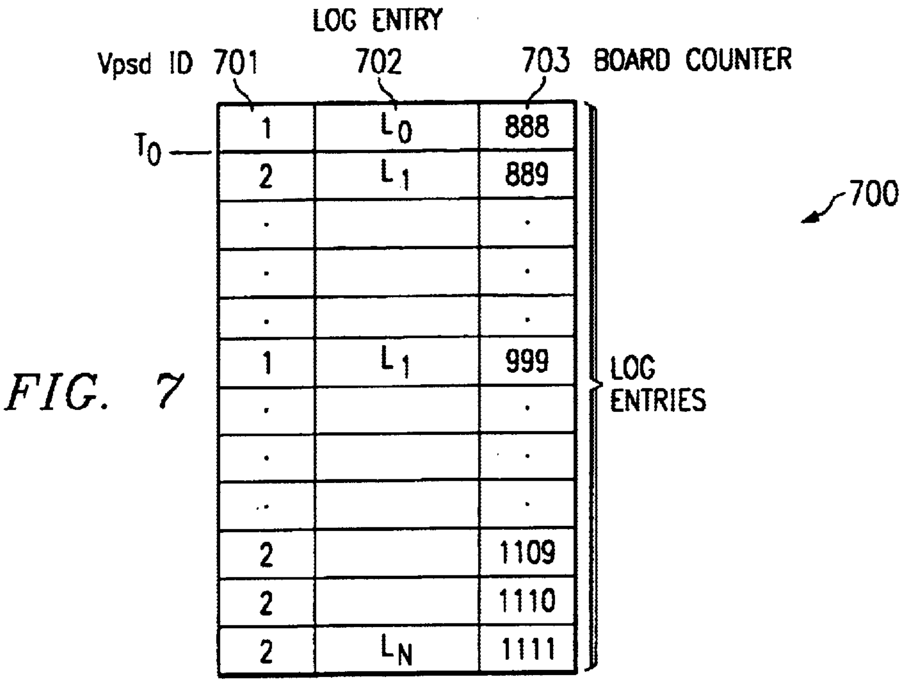
FIG. 7 illustrates a preferred embodiment data structure of a log file.

A preferred embodiment data structure 700 of a log file, as might be stored on a bulk storage device, is shown in FIG. 7. Data structure 700 of FIG. 7 includes a plurality of log entries, corresponding to Vpsd transactions in a host secure device, each including Vpsd ID 701, log entry data 702, and counter 703. Vpsd ID 701 preferably identifies the particular Vpsd to which the log entry is associated. Counter 703 is preferably serial transaction counter information useful in detecting log file tampering.

Log entry data 702 preferably includes information regarding the status of the Vpsd after the completion of the logged transaction, such as the state of the registers etc., to thereby provide an expected current state of that Vpsd. Preferably, in order to prevent attacks on this information in the log file, the log entry data may include a digital signature of the information therein, such as may be provided by the Vpsd utilizing the PSK and/or the secure device using an appropriate secret key. The log entry data may also include transaction information such as a demand data packet, a data packet issued in response to a demand, such as an indicia created in response to a demand, and/or the like. Moreover, as a data packet produced in response to a demand may itself include information such as ascending and descending register status, such as for validation purposes, which is signed for data integrity, the storing of information in the log file to prevent attacks may utilize this same data and thereby avoid the additional use of resources in its creation.

Utilizing the data structure of FIG. 7, the integrity of the log file may be verified as described above. Specifically, the integrity of a single log entry (Li) may be verified, and therefore trusted, by verifying its signature with a crypto device. Additionally, since part of the entry is the security device counter, it can be trusted that the counter for an entry has not been modified by determining that the counter securely stored in the security device matches the counter in the last log entry and that there are no gaps in the serial progression of the log file counter entries.

i.e., $L_N$ Counter=Secure Device Counter; and $L_i$ Counter−$L_{i-1}$ Counter=1

This protects against a replacement or cutting-off of the log file. Accordingly, the last entry in the log file may be trusted. Moreover, given that the difference in the counters between two consecutive log entries should always equal 1, tampering with log file entries may be detected.

However, it is envisioned that such a system may be utilized to service a very large number of demands. For example, where remote metering is offered on a national scale over a ubiquitous network, such as the Internet, the number of user demands served in a single day may be in the thousands or hundreds of thousands. Accordingly, the above described log file may become burdensomely large. It may be desired to truncate such a log file, such as by removing a portion of the historical information. A preferred embodiment of the present invention operates to remove the oldest entries from a log file wherein only log entries aged to a particular threshold are maintained in the log file. Preferably removal of such log entries is done in conjunction with auditing of the Vpsd data, as will be discussed in more detail below, to verify that no tampering has occurred and/or to ensure that no opportunity for tampering is presented by the truncation of the log file.

In order to accommodate the controlled truncation of the log file and/or to assist in the logical auditing of the Vpsds, the preferred embodiment log file includes timing information. For example, every log entry may contain the time of its generation. Of course, other information may be utilized in the alternative to or in addition to the time of generation, such as the aforementioned counter information which, because it is serially produced, gives information with respect to timing.

However, according to the most preferred embodiment a time stamp ($T_i$) providing the time of generation of the log entry is provided in the log entry. After a log-file is audited, it may be truncated, i.e., remove old entries from the top for storage and/or performance reasons. According to this embodiment, $T_0$ is defined as the last audit time of a log file. Accordingly, $T_i$ for all the remaining log entries should be greater or equal to $T_0$.

i.e., $T_{L0} \geqq T_0$; and $T_{LN} > T_0$

This provides protection against malicious truncation of the log file by an attacker. For example, if an attacker removes entries from the beginning of the log file, this condition will no longer hold, unless $T_0$ is modified accordingly. To protect $T_0$ this reference value may be stored inside the secure device and/or in protected form elsewhere, such as in encrypted form on the bulk storage media, making its corresponding modification impossible.

Knowing that the log file is complete, we may then rely upon the log file to verify the status of Vpsd data by comparing this data to the Vpsd data snap shot provided by the log file. However, it is conceivable that a particular Vpsd may not be utilized in the particular time periods associated with a truncated log file and, therefore, may not have an associated entry within the log file for verification. Accordingly, the preferred embodiment of the present invention provides information with respect to the last audit in the Vpsd data.

For example in a most preferred embodiment every Vpsd will contain the time of last audit ($T_{audit}$). Accordingly, when a Vpsd is retrieved into a host secure device to perform an operation, a check of the Vpsd audit time can be made against $T_0$.

i.e., Vpsd $T_{audit} \geqq T_0$

This verification protects against a replacement of a Vpsd by its earlier version, i.e., one which may not be in the log file any longer, or replacement of a Vpsd for which a log entry does not appear in the log file with an even earlier version of that Vpsd.

Figure 8:
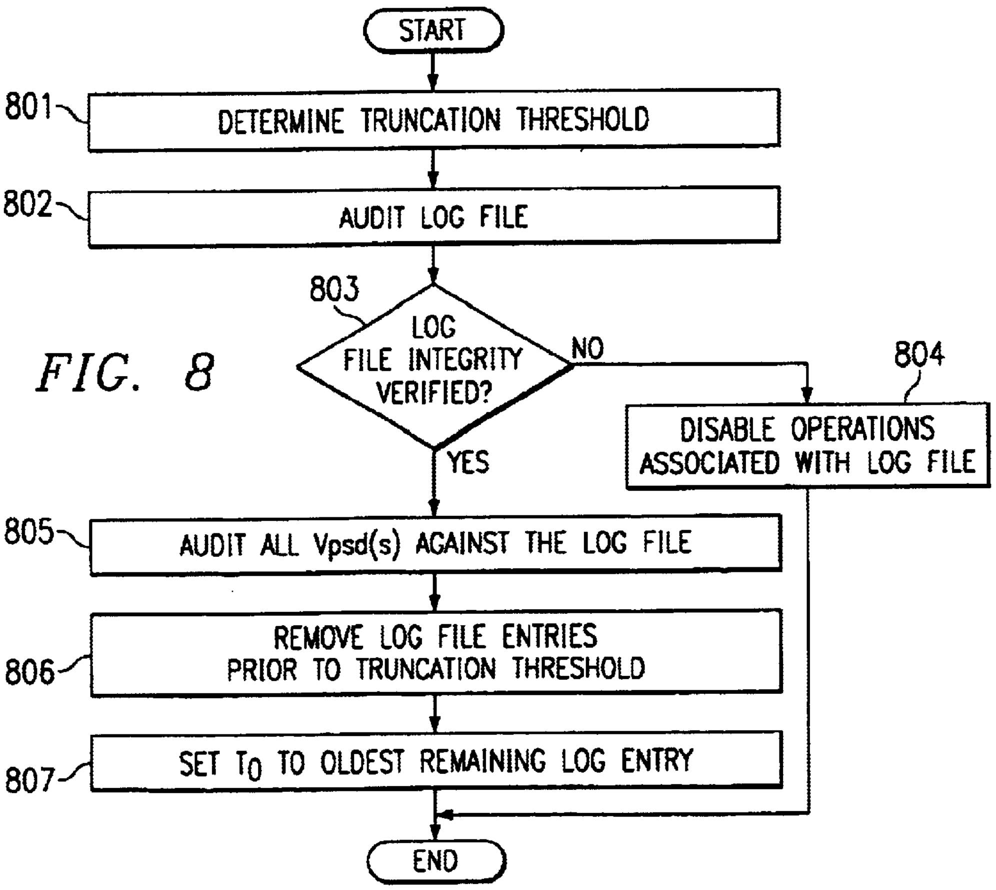
FIG. 8 illustrates a flow diagram of data auditing according to a preferred embodiment of the present invention.

Auditing of the stored information according to a preferred embodiment of the present invention is described with reference to FIG. 8. The preferred embodiment of FIG. 8 begins at step 801 wherein a desired truncation threshold is determined. This threshold may be based upon various considerations such as a length of time into the past for which transaction log information is desired to be retained, a length of time since a last audit was performed, a size of log file which is efficient to utilize according to the present invention or which will properly reside within a desired amount of storage space, an amount or number of transaction log file entries which are desired to be removed, the occurrence of a particular event suggesting an audit is desirable, and/or the like. It should be appreciated that the above conditions may be used in combination to determine a transaction threshold for use in an audit. For example, the system may operate to perform an audit every evening during off-peak service hours (a threshold associated with a length of time into the past for which transaction log information is desired to be retained and/or a length of time since a last audit was performed). The system may also operate to perform an audit, in addition to the scheduled off-peak audit, upon the occurrence of particular events, such as the addition of server components or the detection of tampering with Vpsd data.

At step 802 the log file itself is audited to provide confidence in the integrity of the data contained therein. Auditing of the log file is preferably includes verification of the last log entry counter with the corresponding security device counter, verifying the time of last audit with $T_0$, and verification that no gaps exist between log entries.

At step 803 a determination is made as to whether the log file data integrity is confirmed. If there is an indication that the log file data has been tampered with or its integrity is otherwise suspect, the preferred embodiment proceeds to step 804 wherein further operations associated with the log file are disabled. Such disabled operations may include preventing a secure device associated with the log file from performing further functions until the source of the suspicious data can be determined and corrected. Additionally or alternatively, all Vpsds associated with the log file may be suspended from further operation until the source of the suspicious data can be determined and corrected.

If a determination is made at step 803 that the log file data is acceptable, step 805 operates to audit all Vpsds against the log file. It should be appreciated that there is no limitation of performing the audit of the log file prior to the auditing of the Vpsds. However, a preferred embodiment of the present invention first verifies the log file integrity prior to auditing each Vpsd as it is envisioned that verification of the log file will be a relatively simple process as compared to auditing each of the Vpsds and if the log file data is suspect, as determined by an audit thereof, the auditing of the Vpsds will be suspect and, therefore, of little additional value.

Auditing of the Vpsds preferably includes loading each Vpsd and comparing data therein to the data of a last log entry for that Vpsd. This comparison will verify that the Vpsd has not been modified since its last operation. If the Vpsd verification is proper, then time of audit information is preferably updated therein (set Vpsd $T_{audit}$=Current Time). However, if Vpsd verification is not proper, then the preferred embodiment operates to disable further operations utilizing that particular Vpsd.

It should be appreciated that auditing of the Vpsds as described above includes comparison to log file entry data. However, if a Vpsd has not been utilized in performing operations since a last audit, there may be no log file entry for the Vpsd. Auditing of such a Vpsd is preferably accomplished by comparing the time of audit (Vpsd $T_{audit}$) information therein with the time of last audit ($T_0$). If the time of audit of the Vpsd is greater or equal to the time of the last audit (Vpsd $T_{audit} \geqq T_0$) then the data of the Vpsd can be trusted (given that the log file is audited to ensure integrity thereof). Accordingly, at step 307 the time of audit information of the Vpsd may preferably be updated therein (set Vpsd $T_{audit}$=Current Time).

At step 806 the log file entries prior to the selected truncation threshold are preferably removed from the log file. Accordingly, at step 807 the time of last audit ($T_0$) is preferably set to the earliest remaining log entry time of audit information.

It should be appreciated that auditing of the Vpsds as described above may itself generate new log entries. These log entries may be retained, such as through addition to the newly truncated log file, if desired. However, a preferred embodiment removes these auditing log entries to minimize the space required to store the log file, because the information with respect to auditing the Vpsds is reflected in the time information.

It should be appreciated that the above described steps of auditing may involve appreciable processing power and/or time. In order to minimize any impact upon servicing user demands, a preferred embodiment of the present invention utilizes a secure device intended for supervisory and/or maintenance functions to provide auditing to thereby free other available secure devices for serving user demands etc.

Although a preferred embodiment has been disclosed, one of skill in the art will appreciate that the present invention may be accomplished by various other means. For example, rather than using the Demand program at PC 20, a simple e-mail program might be used to transmit the necessary information to a remote metering device. E-mail programs are well known in the art and are capable of providing the encrypted bidirectional information communication desirous in the present invention.

Furthermore, PC 10 may advantageously be a public information server such as a web server on the Internet. Such an implementation of PC 10 is very conducive to an e-mail implementation of PC 20 as discussed above.

Moreover, although the preferred embodiment discloses use of the present invention to transmit postal indicia from a remote metering device, it shall be understood that the present invention may be utilized to transmit any form of indicia or value. For example, the present invention may be utilized to enable users to purchase event admittance tickets (such as to a live theatre event, movie, sporting event, or athletic event), lottery tickets, venue tickets (such as for entering a museum), gift certificates, coupons for discounting the price of an event, activity, or good by a fixed dollar amount or by a percentage of the ticket price, vouchers, licenses (such as a driver's license, hunting license, or fishing license), money order, prepaid duties, and drug prescriptions from a remote metering or dispensing system, and to subsequently print acceptable tickets or tokens on their general purpose printers or otherwise utilize them as desired. Such a system may be useful in the sporting or transportation industry, for example.

Although the present invention and its advantages have been described in detail, it should be understood that various changes, substitutions and alterations can be made herein without departing from the spirit and scope of the invention as defined by the appended claims.

What is claimed is:

1. A system for distributing amounts of value to select ones of a plurality of user processor-based systems in response to demands by ones of the plurality of user processor-based systems, said system comprising:

a host processor-based system;

a bulk memory coupled to said host processor-based system;

at least one portable memory coupled to said host processor-based system;

a plurality of user data files including independent value credit information stored in said bulk memory, wherein ones of said user data files are loaded into said portable memory to thereby configure said portable memory for use in serving a corresponding demand;

a protocol for accepting a demand for an amount of value from a particular one of said user plurality of processor-based systems via a data communication link between said host processor-based system and said particular one of said user processor-based systems and for automatically deducting said amount of value from one or more of said user data files; and a protocol for transmitting a data packet corresponding to said amount of value to said one of said plurality of user processor-based systems.

2. The system of claim 1, wherein said protocol for accepting a demand and for automatically deducting said amount of value is adapted to substantially simultaneously accept demands from user processor-based systems of said plurality in addition to said particular one of said user processor-based systems.

3. The system of claim 1, wherein the bulk memory comprises:

a hard disk drive coupled to the host processor-based system.

4. The system of claim 1, wherein the bulk memory comprises:

an optical disk drive coupled to the host processor-based system.

5. The system of claim 1, wherein the at least one portable memory comprises a secure memory unit.

6. The system of claim 5, wherein ones of said data files each comprise a unique cryptographic key associated therewith for use in credit value transactions using said independent value credit information stored therein, and wherein said secure memory unit comprises a secure memory portion for securely storing a portable memory cryptographic key for use in credit value transactions using said plurality of user data files.

7. The system of claim 5, wherein said secure memory unit comprises a secure memory portion for securely storing an ascending register incremented when credit value transactions are performed on said portable memory using ones of said plurality of user data files.

8. The system of claim 7, further comprising:

a log file including information regarding transactions performed on said portable memory using ones of said plurality of user data files and corresponding ascending register values.

9. The system of claim 1, wherein the at least one portable memory comprises a touch memory utility button.

10. The system of claim 1, wherein the at least one portable memory comprises a circuit card adapted to provide data security.

11. The system of claim 10, wherein the at least one portable memory comprises an array of circuit cards adapted to provide data security.

12. The system of claim 10, wherein said circuit card comprises a PCI circuit card.

13. The system of claim 10, wherein said circuit card comprises a cryptographic co-processor.

14. The system of claim 10 wherein said circuit card comprises a PCMCIA circuit card.

15. The system of claim 1, wherein the at least one portable memory comprises a smart disk.

16. The system of claim 1, wherein the at least one portable memory comprises a smart card.

17. The system of claim 1, wherein said accepted demand comprises data indicating a particular user data file of said plurality of data files for providing said amount of value.

18. The system of claim 1, wherein said data communication link between said host processor-based system and said particular one of said plurality of user processor-based systems comprises an information communication link selected from the group consisting of:

a public switched network;

a public information communication system;

the Internet;

a cable system; and a satellite system.

19. The system of claim 1, wherein said amount of value is postage value.

20. The system of claim 1, wherein ones of said user data files comprise an ascending register and descending register in clear text.

21. The system of claim 1, wherein ones of said user data files comprise a private cryptographic key and a corresponding key certificate, wherein said key certificate is in clear text.

22. The system of claim 1, wherein ones of said user data files comprise unique virtual security device identification information in clear text.

23. The system of claim 1, wherein ones of said user data files comprise user licensing information in clear text.

24. The system of claim 1, wherein ones of said user data files comprise license ZIP code information in clear text.

25. The system of claim 1, wherein ones of said user data files comprise customer identification information in clear text.

26. The system of claim 1, wherein ones of said user data files comprise clear text information, secret information stored in a protected format, and unique information derived from said clear text information and said secret information.

27. The system of claim 26, wherein said unique information is an irreversible hash.

28. The system of claim 26, wherein said protected format includes random information included with said secret information.

29. The system of claim 1, wherein said demand for an amount of value comprises a predetermined amount of value credit desired.

30. The system of claim 1, wherein said demand for an amount of value comprises information from which an amount of value credit may be determined.

31. A system for conducting transactions with select ones of a plurality of processor-based systems in response to requests by ones of the plurality of processor-based systems, wherein said transactions are associated with amounts of value credit available to said select ones of said plurality of processor-based systems, said system comprising:

a server system;

an unsecure memory coupled to said server system;

at least one secure memory coupled to said server system;

a plurality of user data files including independent value credit information stored in said unsecure memory, wherein at least a portion of ones of said user data files are loaded into said secure memory to thereby configure said secure memory for use in conducting a transaction serving a request;

a protocol for accepting a request for a selected transaction from a particular one of said plurality of processor-based systems via a data communication link between said server system and said particular one of said processor-based systems and for identifying a particular user data file for use in serving said request; and a protocol for retrieving said particular user data file and configuring said at least one secure memory for performing said selected transaction and for restoring said particular user data file in said unsecure memory after completion of said selected transaction.

32. The system of claim 31, wherein said selected transaction comprises deduction of value credit from said particular user data file, and wherein said restored particular user data file has a corresponding amount of value credit deducted from said retrieved particular user data file.

33. The system of claim 32, wherein said selected transaction comprises transmitting a data packet corresponding to said amount of value to said one of said plurality of processor-based systems.

34. The system of claim 31, wherein said protocol for accepting a request and for identifying a particular user data file at least in part utilizes public key cryptography in identifying a particular user data file to associate with said request.

35. The system of claim 31, wherein said protocol for accepting a request and for identifying a particular user data file at least in part utilizes a secret shared between said server system and at least one of said plurality of processor-based systems.

36. The system of claim 31, wherein said protocol for retrieving said particular user data file and restoring said particular user data file comprises a comparison of information within said particular user data file with information stored in a log file.

37. The system of claim 36, wherein said protocol for retrieving said particular user data file and restoring said particular user data file further comprises a comparison of information within said log file and information securely stored in said secure memory independent of said particular user data file.

38. The system of claim 31, wherein the unsecure memory comprises a memory selected from the group consisting of:

a hard disk drive;

an optical disk drive; and a random access memory.

39. The system of claim 31, wherein ones of said user data files each comprise a cryptographic key associated with said user data file for use in credit value transactions using said independent value credit information stored therein, and wherein said at least one secure memory comprises a secure memory portion for securely storing a cryptographic key associated with said secure memory for use in credit value transactions using said plurality of user data files.

40. The system of claim 31, wherein said at least one secure memory comprises a secure memory portion for securely storing a register incremented when credit value transactions are performed on said at least one secure memory using ones of said plurality of user data files.

41. The system of claim 40, wherein said register stored in said secure memory is a transaction counter.

42. The system of claim 40, wherein said register stored in said secure memory is a cumulative credit value register.

43. The system of claim 40, further comprising:

a log file including information regarding transactions performed on said at least one secure memory using ones of said plurality of user data files and corresponding register values.

44. The system of claim 31, wherein the at least one secure memory is selected from the group consisting of:

a touch memory utility button;

an array of touch memory utility buttons;

a circuit card adapted to provide data security;

an array of circuit cards adapted to provide data security;

a smart disk; and a smart card.

45. The system of claim 31, wherein said data communication link between said server system and said particular one of said plurality of user processor-based systems comprises an information communication link selected from the group consisting of:

a public switched network;

a public information communication system;

the Internet;

a cable system; and a satellite system.

46. The system of claim 31, wherein ones of said user data files comprise an ascending register and descending register.

47. The system of claim 31, wherein ones of said user data files comprise a private cryptographic key and a corresponding key certificate.

48. The system of claim 31, wherein ones of said user data files comprise a private cryptographic key and a certificate identifier of a corresponding key certificate.

49. A system for providing a plurality of virtual secure user devices configured for particular entities, wherein ones of said virtual secure user devices are independently operable on a common secure device to accommodate interaction with said particular entities, said system comprising:

a storage device providing bulk storage of information;

a virtual user device data structure suitable for storage on said storage device, wherein said virtual user device data structure includes an entity information portion, a secret information portion, and an information integrity portion; and a secure device coupled to said bulk storage device configurable to operate as a particular user device through use of a corresponding data set of said virtual user device data structure, wherein said secure device is operable to accept at least a portion of said particular data set, verify integrity of data of said user information portion utilizing said secret information portion and said information integrity portion, and utilize data of said entity information portion to configure said secure device as said particular entity device.

50. The system of claim 49, wherein said virtual user device is operable as a postal security device storing postage credit value.

51. The system of claim 49, wherein said virtual user device is operable as a postal security device storing postage credit value.

52. The system of claim 49, wherein said entity information portion as stored on said storage device is in clear text.

53. The system of claim 49, wherein said secret information portion as stored on said storage device is in encrypted text.

54. The system of claim 53, wherein said encrypted text includes secret information and random information.

55. The system of claim 49, wherein said information integrity portion comprises unique information derived from said entity information and said secret information.

56. The system of claim 55, wherein said unique information comprises an irreversible hash.

57. The system of claim 49, further comprising a transaction log data structure suitable for storage on said storage device, wherein said transaction log data structure includes a virtual user device portion corresponding to a status after conducting a last transaction, a serial register portion corresponding to a status of said secure device after conducting a last transaction, and a log integrity portion.

58. The system of claim 57, wherein said log integrity portion comprises a digital signature of said virtual user device portion.

59. The system of claim 57, wherein said log integrity portion comprises information with respect to a last audit of said transaction log.

60. The system of claim 59, wherein said virtual user device data structure further includes information with respect to a last audit of said virtual user device.

61. A method operable on a remote processor-based system for securely storing amounts of value available to select ones of a plurality of systems in data communication with said remote system, said method comprising the steps of:

initializing a secure memory device coupled to said remote system, wherein initialization of said secure memory device includes storing a private vault key therein;

initializing a plurality of virtual user devices, wherein each said virtual user device includes data suitable for configuring said secure memory device to operate as a particular user's secure device, wherein said data includes an amount of value available to said particular user and a private virtual device key unique to said virtual user device; and storing each virtual user device of said plurality in an unsecure memory, wherein said private virtual device key is secreted prior to storage in said unsecure memory using a technique reversible only by utilizing said private vault key.

62. The method of claim 61, wherein said step of initializing a secure memory device comprises the step of:

communicating with a master secure memory device to receive said private vault key therefrom.

63. The method of claim 61, wherein said private vault key is a symmetric cryptographic key, and wherein said step of storing each virtual user device utilizes said private vault key to encrypt said private virtual device key.

64. The method of claim 61, wherein said private vault key is an asymmetric cryptographic key, and wherein said step of storing each virtual user device utilizes a cryptographic key corresponding to said private vault key to encrypt said private virtual device key.

65. The method of claim 61, wherein said step of initializing a plurality of virtual user devices, for each said virtual user device, comprises the steps of:

generating a cryptographic key set; and obtaining a key certificate for at least one key of said cryptographic key set.

66. The method of claim 61, wherein said step of storing each virtual user device comprises the steps of:

generating data integrity information utilizing said amount of value and said private virtual device key;

storing said amount of value available in clear text in said unsecure memory;

storing said data integrity information in said unsecure memory; and storing said secreted private virtual device key in said unsecure memory.

67. The method of claim 66, wherein said data integrity information comprises an irreversible hash.

68. The method of claim 67, wherein said data of said virtual user device further includes information selected from the group consisting of:

an ascending register;

a virtual user device ID; and virtual user device licensing information.

69. The method of claim 61, further comprising the step of:

maintaining a transaction log, wherein said transaction log comprises information relevant to transactions conducted utilizing ones of said plurality of virtual user devices.

70. The method of claim 69, wherein said step of initializing a secure memory device comprises the step of:

initializing a transaction register stored in said secure memory device independent of any particular one of said plurality of virtual user devices.

71. The method of claim 69, wherein a status of said transaction register is stored in said transaction log corresponding to said transactions conducted utilizing ones of said plurality of virtual user devices.

72. The method of claim 69, further comprising the step of:

auditing said transaction log to verify the integrity of the data contained therein.

73. The method of claim 72, wherein said step of auditing said transaction log is initiated upon the occurrence of a predetermined event.

74. The method of claim 73, wherein said predetermined event is the conducting of a predetermined number of transactions.

75. The method of claim 73, wherein said predetermined event is the elapse of a predetermined amount of time since a last audit of said transaction log.

76. The method of claim 73, wherein said predetermined event is the suspicion of the integrity of the transaction log.

77. The method of claim 73, wherein said predetermined event is the suspicion of the integrity of a virtual user device.

78. The method of claim 72, wherein said step of auditing said transaction log comprises the step of:

accessing each virtual user device of said plurality of virtual user devices to verify consistency of data stored in said transaction log and said virtual user devices.

79. The method of claim 72, wherein said step of auditing said transaction log comprises the step of:

updating information associated with a time of last audit of said transaction log.

80. The method of claim 79, wherein said data of said virtual user devices includes information associated with a time of last audit of said transaction log, and wherein said step of auditing said transaction log comprises the step of:

updating said data of said virtual user devices to provide update information with respect to a time of last audit of said transaction log.

81. A method operable on a remote processor-based system for distributing predetermined amounts of postage to select ones of a plurality of processor-based systems in data communication with said remote system in response to purchase demands by select ones of the plurality of processor-based systems, said method comprising the steps of:

storing a plurality of individual postage value credits in an unsecure memory in a data structure providing a plurality of virtual security device portions;

accepting a demand for an amount of postage from a particular one of said plurality of processor systems via a data communication link between said remote system and said particular one of said processor systems, wherein said remote system is adapted to substantially simultaneously accept demands from processor systems of said plurality in addition to said particular one of said processor systems;

identifying a proper virtual security device portion of said data structure stored in said unsecure memory to service said demand;

loading said identified virtual security device portion into a secure memory;

verifying the integrity of the identified portion of said data structure;

deducting at least a portion of said amount of postage from said identified portion of said data structure as loaded into said secure memory;

transmitting a data packet corresponding to said amount of postage to said one of said plurality of processor systems; and unloading said identified portion of said data structure from said secure memory, as manipulated by said deducting step, for storage in said unsecure memory as a virtual security device portion of said data structure.

82. The method of claim 81, wherein said step of storing a plurality of individual postage credits comprises, for each virtual security device portion, the steps of:

generating a first hash of virtual security device information, including postage value credit information, and secret information;

encrypting said secret information; and writing said hash, said encrypted secret information, and said virtual security device information in said data structure.

83. The method of claim 82, wherein said step of encrypting said secret information comprises the step of:

appending random information to said secret information.

84. The method of claim 82, wherein said virtual security device information is stored in said unsecure memory in clear text.

85. The method of claim 82, wherein said step of verifying the integrity of the identified portion of said data structure comprises the step of:

decrypting said encrypted secret information;

generating a second hash of virtual security device information retrieved from said unsecure memory and said decrypted secret information; and comparing said first hash and said second hash.

86. The method of claim 81, further comprising the step of:

updating a transaction log each time a portion of said amount of postage is deducted by said deducting step.

87. The method of claim 86, wherein said transaction log comprises information with respect to a status of said identified portion of said data structure and a transaction register of said secure memory.

88. The method of claim 81, further comprising the step of:

validating said demand to ensure said one of said plurality of processor systems is eligible to receive said amount of postage, wherein said deducting step is performed if said validating means determines said one of said plurality of processor systems is eligible.

89. The method of claim 81, further comprising:

storing information to be utilized with said amount of postage selectable from shorthand information provided in said demand.

* * * * *